US012305429B2

(12) United States Patent
Schein

(10) Patent No.: US 12,305,429 B2
(45) Date of Patent: May 20, 2025

(54) CABLE LOCK

(71) Applicant: Gary Schein, Oxnard, CA (US)

(72) Inventor: Gary Schein, Oxnard, CA (US)

( * ) Notice: Subject to any disclaimer, the term of this patent is extended or adjusted under 35 U.S.C. 154(b) by 0 days.

(21) Appl. No.: 18/773,237

(22) Filed: Jul. 15, 2024

(65) Prior Publication Data

US 2024/0392609 A1 Nov. 28, 2024

Related U.S. Application Data

(63) Continuation of application No. 17/795,840, filed on Jul. 27, 2022, now Pat. No. 12,037,815.

(51) Int. Cl.

| | |
|---|---|
| ***E05B 67/00*** | (2006.01) |
| ***E05B 37/00*** | (2006.01) |
| ***E05B 37/02*** | (2006.01) |
| ***E05B 67/06*** | (2006.01) |

(52) U.S. Cl.

CPC ........ *E05B 67/003* (2013.01); *E05B 37/0058* (2013.01); *E05B 67/063* (2013.01); *E05B 37/025* (2013.01)

(58) Field of Classification Search

CPC .. E05B 67/003; E05B 37/0058; E05B 67/063; E05B 37/025; E05B 73/0017; E05B 73/0029; E05B 67/22; E05B 67/383; E05B 67/006; E05B 73/0005; E05B 67/36; E05B 37/02; G09F 3/0352; G09F 3/0347; G09F 3/03; G09F 3/0305; G09F 3/0323; Y10T 292/48; Y10T 292/491; Y10T 292/494; Y10T 292/497; Y10T 292/498; Y10T 292/499; Y10T 292/505; Y10T 292/506; Y10T 292/509; Y10T 292/513; Y10T 292/516; Y10T 292/528; Y10T 70/409; Y10T 70/483

See application file for complete search history.

(56) References Cited

U.S. PATENT DOCUMENTS

| | | | | | |
|---|---|---|---|---|---|
| 349,031 | A * | 9/1886 | Cook | F16G 11/10 | 24/134 P |
| 465,450 | A * | 12/1891 | Brooke | E05B 37/025 | 70/53 |
| 626,230 | A * | 6/1899 | Hawes | F16G 11/10 | 24/134 P |
| 695,458 | A * | 3/1902 | Hulzer et al. | E05B 67/003 | 70/49 |

(Continued)

*Primary Examiner* — Kristina R Fulton
*Assistant Examiner* — Faria F Ahmad
(74) *Attorney, Agent, or Firm* — LYON & HARR, LLP; Richard T. Lyon

(57) ABSTRACT

A keyed or combination cable lock for securing one or more cables or a lock shackle is presented. The lock secures one or both ends of a single cable or one end each of two separate cables when locked. Alternatively, the lock can secure one or both ends of a lock shackle. When the lock is unlocked, the secured ends can be removed from the lock by activation of a control knob. The lock is also able to a secure a section of a single slidable cable or two sections of a single slidable cable so that the lock can be slid down the slidable cable[s] in first direction when the lock is locked or unlocked, but the lock can be slid down the slidable cable[s] in the opposite direction only when the lock is unlocked and a control knob is activated.

19 Claims, 16 Drawing Sheets

(56) References Cited

U.S. PATENT DOCUMENTS

| | | | | | |
|---|---|---|---|---|---|
| 719,866 | A * | 2/1903 | Porter | G09F 3/0352 | 292/308 |
| 1,355,387 | A * | 10/1920 | Cohen | E05B 37/10 | 70/53 |
| 1,452,393 | A * | 4/1923 | Shek | E05B 67/22 | 70/38 C |
| 1,832,270 | A * | 11/1931 | Wenk | B65D 77/185 | 292/325 |
| 1,962,964 | A * | 6/1934 | Morrison | F16G 11/101 | 24/134 P |
| 2,226,393 | A * | 12/1940 | Seeger | F16G 11/101 | 24/134 P |
| 3,897,161 | A * | 7/1975 | Reinwall, Jr. | F16G 11/14 | 24/134 P |
| 3,965,544 | A * | 6/1976 | Boden | F16G 11/106 | 403/374.2 |
| 4,807,333 | A * | 2/1989 | Boden | F16G 11/106 | 24/136 R |
| 4,883,295 | A * | 11/1989 | Kesselman | G01F 15/007 | 292/307 R |
| 5,070,805 | A * | 12/1991 | Plante | F16G 11/101 | 24/134 P |
| 5,114,196 | A * | 5/1992 | Storer | G09F 3/0358 | 292/307 R |
| 5,356,412 | A * | 10/1994 | Golds | A61B 17/1327 | 606/151 |
| 5,440,788 | A * | 8/1995 | Boden | F16G 11/101 | 24/129 D |
| 5,572,770 | A * | 11/1996 | Boden | F16G 11/101 | 24/136 R |
| 5,791,170 | A * | 8/1998 | Officer | E05B 67/003 | 70/49 |
| D439,825 | S * | 4/2001 | Lai | D8/334 | |
| D448,273 | S * | 9/2001 | Lai | D20/27 | |
| 6,363,758 | B1 * | 4/2002 | Ling | E05B 37/025 | 70/30 |
| 6,408,660 | B1 * | 6/2002 | Lai | G09F 3/0352 | 40/6 |
| 6,470,718 | B1 * | 10/2002 | Yang | E05B 67/003 | 70/30 |
| 6,526,785 | B1 * | 3/2003 | Asenstorfer | E05B 67/006 | 70/53 |
| 6,609,399 | B1 * | 8/2003 | Daniels, Jr. | E05B 67/003 | 70/30 |
| 6,997,023 | B1 * | 2/2006 | Huang | E05B 37/0034 | 70/284 |
| 7,152,439 | B1 * | 12/2006 | Chang | E05B 37/025 | 24/134 P |
| 7,526,932 | B2 * | 5/2009 | Funtmann | E05B 67/006 | 70/30 |
| 7,631,524 | B2 * | 12/2009 | Araujo | E05B 67/06 | 70/52 |
| 7,685,851 | B2 * | 3/2010 | Lai | E05B 37/025 | 70/30 |
| 7,784,313 | B2 * | 8/2010 | Wyers | E05B 67/003 | 70/49 |
| 7,870,764 | B2 * | 1/2011 | Burmesch | E05B 67/003 | 70/38 C |
| 8,142,434 | B2 * | 3/2012 | Bluechel | F16G 11/101 | 606/280 |
| 8,234,757 | B2 * | 8/2012 | Lesley | B60P 7/0823 | 24/68 CD |
| 8,297,086 | B2 * | 10/2012 | Yu | E05B 67/003 | 70/30 |
| D691,869 | S * | 10/2013 | Plato | D8/333 | |
| 8,789,485 | B2 * | 7/2014 | Juenger | B63B 21/04 | 292/307 R |
| 8,875,550 | B1 * | 11/2014 | Spunt | G07C 9/00896 | 70/53 |
| 9,032,764 | B2 * | 5/2015 | Yeh | E05B 67/003 | 70/49 |
| 9,105,168 | B2 * | 8/2015 | Shute | E05B 73/0029 | |
| D738,187 | S * | 9/2015 | Garthe | D8/343 | |
| 9,131,750 | B2 * | 9/2015 | Takahashi | A43C 7/08 | |
| 9,388,606 | B2 * | 7/2016 | Garthe | E05B 67/003 | |
| 9,618,135 | B1 * | 4/2017 | Kjar | F16K 35/00 | |
| 10,352,068 | B2 * | 7/2019 | Hollis | E05B 67/006 | |
| 10,550,608 | B2 * | 2/2020 | Lam | E05B 63/0065 | |
| 11,339,851 | B2 * | 5/2022 | Yu | E05B 37/16 | |
| 11,430,348 | B2 * | 8/2022 | Lubenschii | B65D 55/02 | |
| 11,852,213 | B2 * | 12/2023 | Reynolds | F16G 11/101 | |
| 12,037,815 | B2 * | 7/2024 | Schein | E05B 67/003 | |
| 2006/0042329 | A1 * | 3/2006 | Benda | F16G 11/106 | 70/58 |
| 2006/0075794 | A1 * | 4/2006 | Ling | E05B 73/0005 | 70/58 |
| 2007/0271738 | A1 * | 11/2007 | Yang | F16G 11/106 | 24/163 R |
| 2014/0123439 | A1 * | 5/2014 | Bacon | F16G 11/04 | 24/134 KB |
| 2015/0361691 | A1 * | 12/2015 | Garthe | E05B 67/383 | 24/132 AA |
| 2016/0222698 | A1 * | 8/2016 | Lai | E05B 37/0068 | |
| 2016/0298365 | A1 * | 10/2016 | Christensen | E05B 75/00 | |
| 2018/0153262 | A1 * | 6/2018 | Shimizu | F16G 11/101 | |
| 2018/0223567 | A1 * | 8/2018 | Hollis | E05B 73/0011 | |
| 2021/0078479 | A1 * | 3/2021 | Lopez | F16G 11/106 | |
| 2022/0128121 | A1 * | 4/2022 | Reynolds | F16G 11/146 | |
| 2023/0366242 | A1 * | 11/2023 | Fan | E05B 9/084 | |

* cited by examiner

CABLE LOCK

CROSS REFERENCE TO RELATED APPLICATION

This application claims the benefit of and priority to U.S. patent application Ser. No. 17/795,840 filed Jul. 27, 2022.

BACKGROUND

Deliveries directly to the home and businesses are becoming more and more common especially since the Covid-19 pandemic. The internet has been a big factor in this change in the way things are ordered and/or purchased and received. An item purchased in a store is normally received at the time of purchase. But for items ordered via the phone or the internet, the items are either picked up later or delivered later. Most items ordered online are delivered to a home, including apartments, or to a business address. The delivery service for an ordered item, which can include FedEx, UPS, Amazon and the Post Office, will normally ring or knock at the door of the delivery address. If the ordering party hears the ring or the knock on the door they can go to the door and recover the delivered item. If they do not hear the ring or knock or if no one is in the home, building, apartment, office or the like where delivery is made, the delivered package remains in front of the door. The exceptions are delivered items that require a signed acceptance of the delivered item, such as a registered package or the like. Thieves are familiar with all this and walk or ride through neighborhoods looking at the front doors of homes or the delivery doors of businesses for delivered packages. The thieves grab the packages and take off. Thieves also walk through apartment buildings and office buildings looking for delivered boxes sitting in front of the apartment hall door or office hall door.

To combat such thefts companies have made lockable chests available that are openable so the delivery service can open the chest and place the delivery in the chest. The chest door is closed, and the delivery man can activate a lock, locking the chest. The homeowner or business owner can unlock the chest at their convenience and retrieve the delivery. The size and/or weight of the chest generally prevents theft of the chest. However, some chests can be secured to the home or business. Such chests are not normally allowed to be used in the hallways of apartments, condos, or office buildings because of their size, which can affect passage through the hallways. The chests can also block off porch areas of homes or the areas around the delivery door of a business. The chests can also adversely affect the décor of the front of a home and stand out as an eyesore.

It seems obvious that home deliveries meaning deliveries to homes, apartments, offices, and businesses, are going to be very normal and common in the future for a variety of reasons. Unfortunately, thefts of unattended delivered items left at a door will also become more common. The use of lockable chests is one solution to the theft problem, but the lockable chest cannot be used universally in all locations because of its size and it can be an eyesore or unattractive item in many locations. In addition, because of their size or because they are secured to a structure, lockable chests cannot easily be moved between times of expectant deliveries.

SUMMARY

One cable lock implementation described herein generally includes at least one cable channel. Each cable channel includes a top-side cable orifice disposed on a top side of the cable lock and a bottom-side cable orifice disposed on a bottom side of the cable lock. The top-side cable orifice exhibits an internal communication through a body of the cable lock with the bottom-side cable orifice. In addition, each cable channel is adapted to receive a slidable cable which passes through the cable channel and out of the top-side and bottom-side cable orifices. The cable lock implementation also includes a slidable cable locking mechanism that whenever in a locked state prevents movement of each slidable cable into the bottom-side orifice of each cable channel, through the cable channel and out of the top-side orifice. However, the slidable cable locking mechanism even in a locked state allows the movement of each slidable cable into a top-side orifice of the cable channel, through the cable channel and out of the bottom-side orifice. Further, the slidable cable locking mechanism whenever in an unlocked state allows movement of each slidable cable into a bottom-side orifice of a cable channel, through the cable channel and out of a top-side orifice if a slidable cable release mechanism is activated. The slidable cable locking mechanism whenever in an unlocked state also allows the movement of each slidable cable into a top-side orifice of the cable channel, through the cable channel and out of a bottom-side orifice regardless of whether the slidable cable release mechanism is activated or not.

Another cable lock implementation described herein generally includes at least one cable channel. Each cable channel includes a top-side cable orifice disposed on a top side of the cable lock and a bottom-side cable orifice disposed on a bottom side of the cable lock. The top-side cable orifice exhibits an internal communication through a body of the cable lock with the bottom-side cable orifice. In addition, each cable channel is adapted to receive a slidable cable which passes through the cable channel and out of the top-side and bottom-side cable orifices. The cable lock implementation also includes a slidable cable locking mechanism that whenever in a locked state prevents movement of each slidable cable into the top-side orifice of each cable channel, through the cable channel and out of the bottom-side orifice. However, the slidable cable locking mechanism even in a locked state allows the movement of each slidable cable into a bottom-side orifice of the cable channel, through the cable channel and out of the top-side orifice. Further, the slidable cable locking mechanism whenever in an unlocked state allows movement of each slidable cable into a top-side orifice of a cable channel, through the cable channel and out of a bottom-side orifice if a slidable cable release mechanism is activated. The slidable cable locking mechanism whenever in an unlocked state also allows the movement of each slidable cable into a bottom-side orifice of the cable channel, through the cable channel and out of a top-side orifice regardless of whether the slidable cable release mechanism is activated or not.

The foregoing Summary is provided to introduce a selection of concepts, in a simplified form, that are further described hereafter in the Detailed Description. This Summary is not intended to identify key features or essential features of the claimed subject matter, nor is it intended to be used as an aid in determining the scope of the claimed subject matter. Its sole purpose is to present some concepts of the claimed subject matter in a simplified form as a prelude to the more detailed description that is presented below.

DESCRIPTION OF THE DRAWINGS

The specific features, aspects, and advantages of the cable lock implementations described herein will become better understood with regard to the following description, appended claims, and accompanying drawings where:

DETAILED DESCRIPTION

Figure 1:
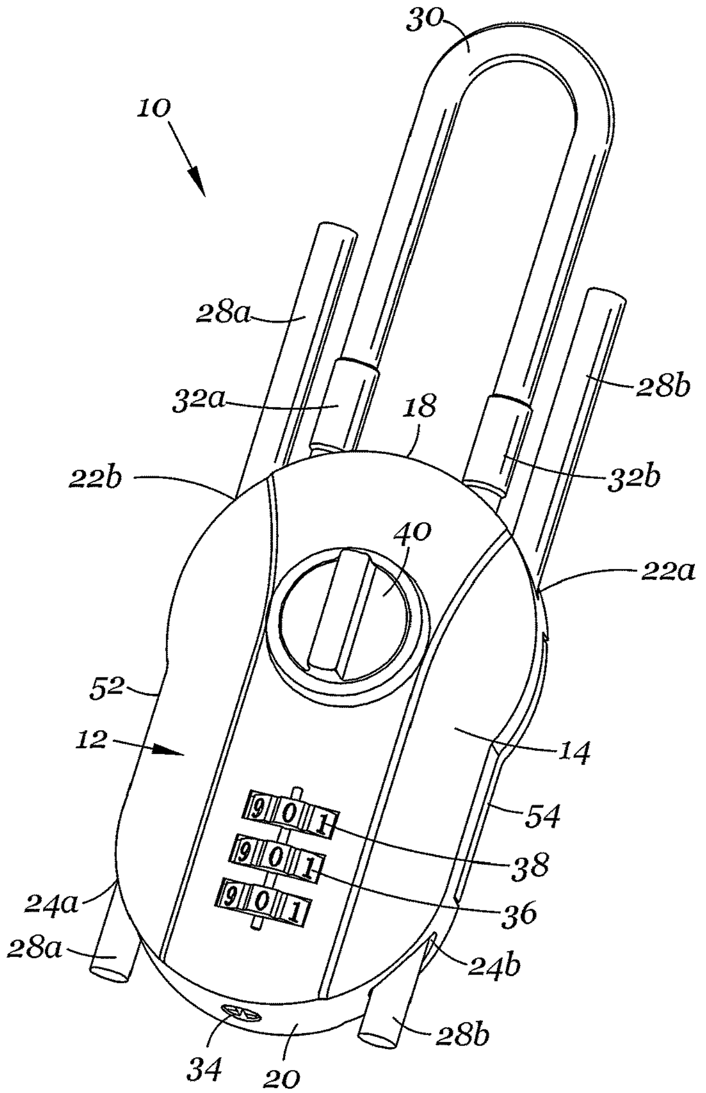
FIG. 1 is a diagram illustrating a perspective top view, in simplified form, of an exemplary implementation of the cable lock described herein with cables.

In the following description of the cable lock implementations reference is made to the accompanying drawings which form a part hereof, and in which are shown, by way of illustration, specific implementations in which the cable lock can be practiced. It is understood that other implementations can be utilized and structural changes can be made without departing from the scope of the cable lock.

It is also noted that for the sake of clarity specific terminology will be resorted to in describing the cable lock implementations and it is not intended for these implementations to be limited to the specific terms so chosen. Furthermore, it is to be understood that each specific term includes all its technical equivalents that operate in a broadly similar manner to achieve a similar purpose. Reference herein to "one implementation", or "another implementation", or an "exemplary implementation", or an "alternate implementation" means that a particular feature, a particular structure, or particular characteristics described in connection with the implementation or implementation can be included in at least one implementation of the cable lock.

The appearances of the phrases "in one implementation", "in another implementation", "in an exemplary implementation", "in an alternate implementation", "in one implementation", "in another implementation", "in an exemplary implementation", and "in an alternate implementation" in various places in the specification are not necessarily all referring to the same implementation or implementation, nor are separate or alternative implementations/implementations mutually exclusive of other implementations/implementations. Yet furthermore, the order of process flow representing one or more implementations or implementations of the cable lock does not inherently indicate any particular order nor imply any limitations of the cable lock.

Furthermore, to the extent that the terms "includes," "including," "has," "contains," variants thereof, and other similar words are used in either this detailed description or the claims, these terms are intended to be inclusive, in a manner similar to the term "comprising", as an open transition word without precluding any additional or other elements.

1.0 Cable Lock

A secure, lockable storage unit that can be removed when not needed and easily provided when required for an expected delivery is needed to receive delivered items at the home, business, etc. A draw string storage bag (also often referred to as a pull string bag), like a duffle bag or laundry bag, could be used if the fabric and threading for the bag was a security or ballistic type fabric, such as Kevlar brand fabric, and the draw strings were metal cable or a security type rope, such as a Kevlar brand rope. The bag could be left open or openable for the expected delivery. The homeowner or business owner could leave the bag outside the home front door, apartment door, office door, the delivery door, or the like (the "Delivery point" herein). The delivery service could put the delivered items in the bag and close off the bag. This would shield the delivered items from view.

Ideally the delivery receipt bag or draw string bag ("bag" herein) could be (1) secured to something about the delivery point and (2) could be closed after the delivery has been made and the closure secured by the delivery service until the delivery recipient opened the bag. The cable lock implementations described herein could be advantageously used to secure the bag to something near the delivery point and secure the closed bag. The delivery recipient could place the empty bag near the delivery point and secure the bag to something near the delivery point employing the lock. The bag opening would be left open for the delivery service. The delivery service would place the delivered item in the open bag, close the bag opening by drawing or pulling the draw or pull strings and the securing the strings with the cable lock to secure closure of the bag. Thus, a single lock could be used to secure the bag at the delivery point and to secure the bag closure in contrast to needing a first lock to secure the bag at a physical location and a second lock to secure the closure of the bag opening. Such a cable lock could also be used to secured backpacks for hiking, camping or for transporting books, records and/or computers, and the like, to and from a place of business or school, and the like.

The cable lock implementations described herein could also be advantageously used during a hike, hunting, camping, playing a pick-up game of basketball and the like, where a person may want to secure their personal goods, such as a cell phone, wallet, auto and/or house keys and the like, so they don't have to attend to them while they hike, play ball, etc. The person can place them in a pull string bag, secure the bag opening with the lock and secure the lock with the attached bag to a pole, fencing, bike, motorcycle, or the like.

Referring to FIG. 1, the cable lock implementations described herein are generally directed to a lock 10 for securing cable or rope (collectively "cable" herein). When using the lock, the external surface of the front shell 14, i.e., the front side of the lock, normally will be facing upward or toward the user of the lock to give access to an actuator that is part of a slidable cable release mechanism, which in the implementation of FIG. 1 is the control knob 40. The numbered combination wheels 38 are accessible from the front or back side of the lock. When viewing the lock as shown in FIG. 1, the first side 52 of the lock is on the left side of the lock and the second side 54 of the lock is on the right side of the lock. The operating components of the lock are in the body as described below.

Figure 3:
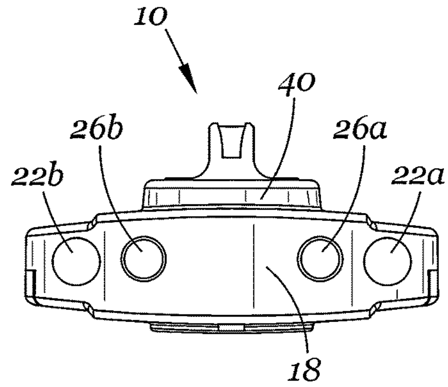
FIG. 3 is a diagram illustrating a plan view, in simplified form, of an exemplary implementation of a first end of the cable lock implementations described herein.
Figure 4:
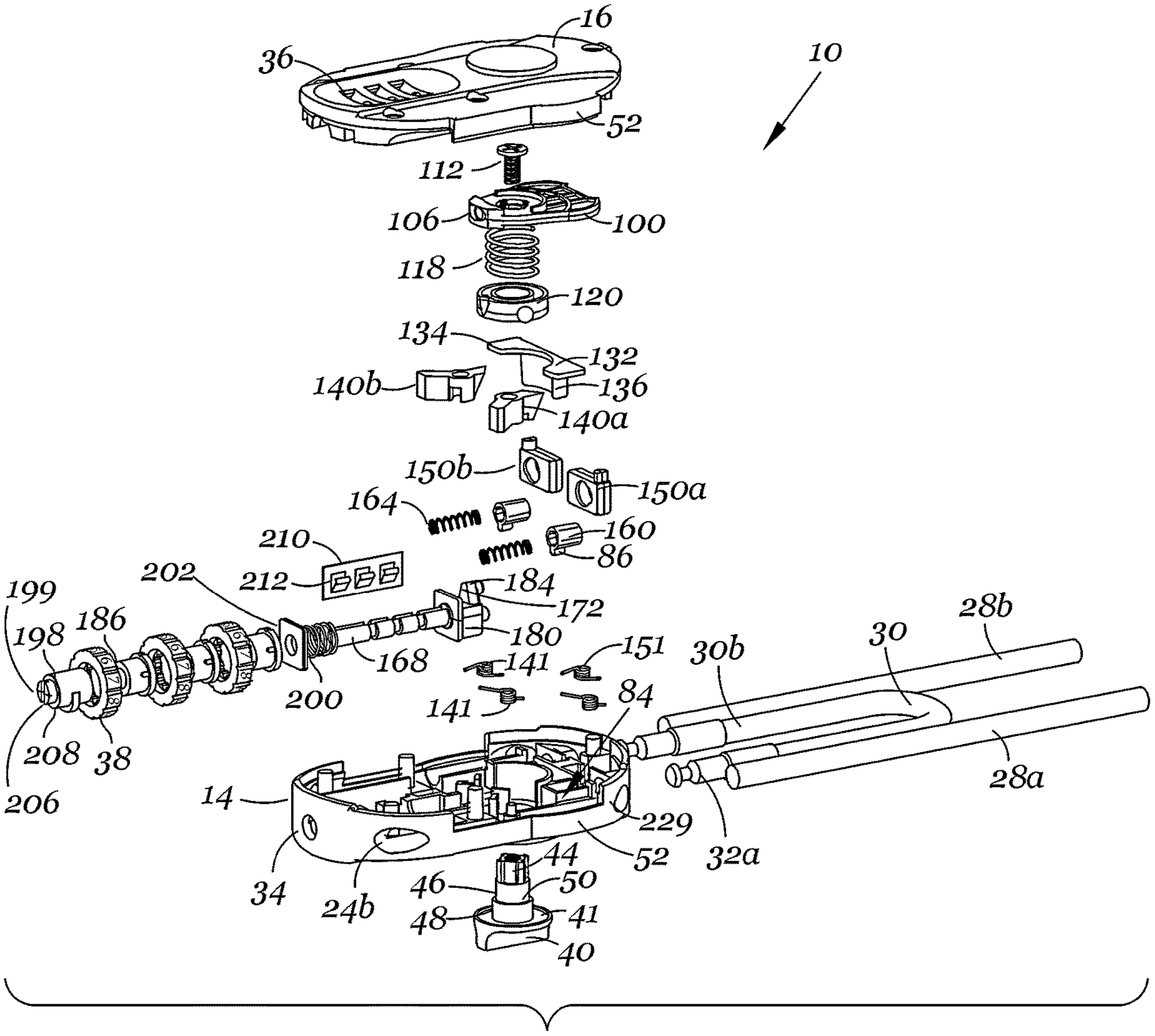
FIG. 4 is an exploded view diagram, in simplified form, of an exemplary implementation of the cable lock described herein as viewed from the backside of the lock.
Figure 5:
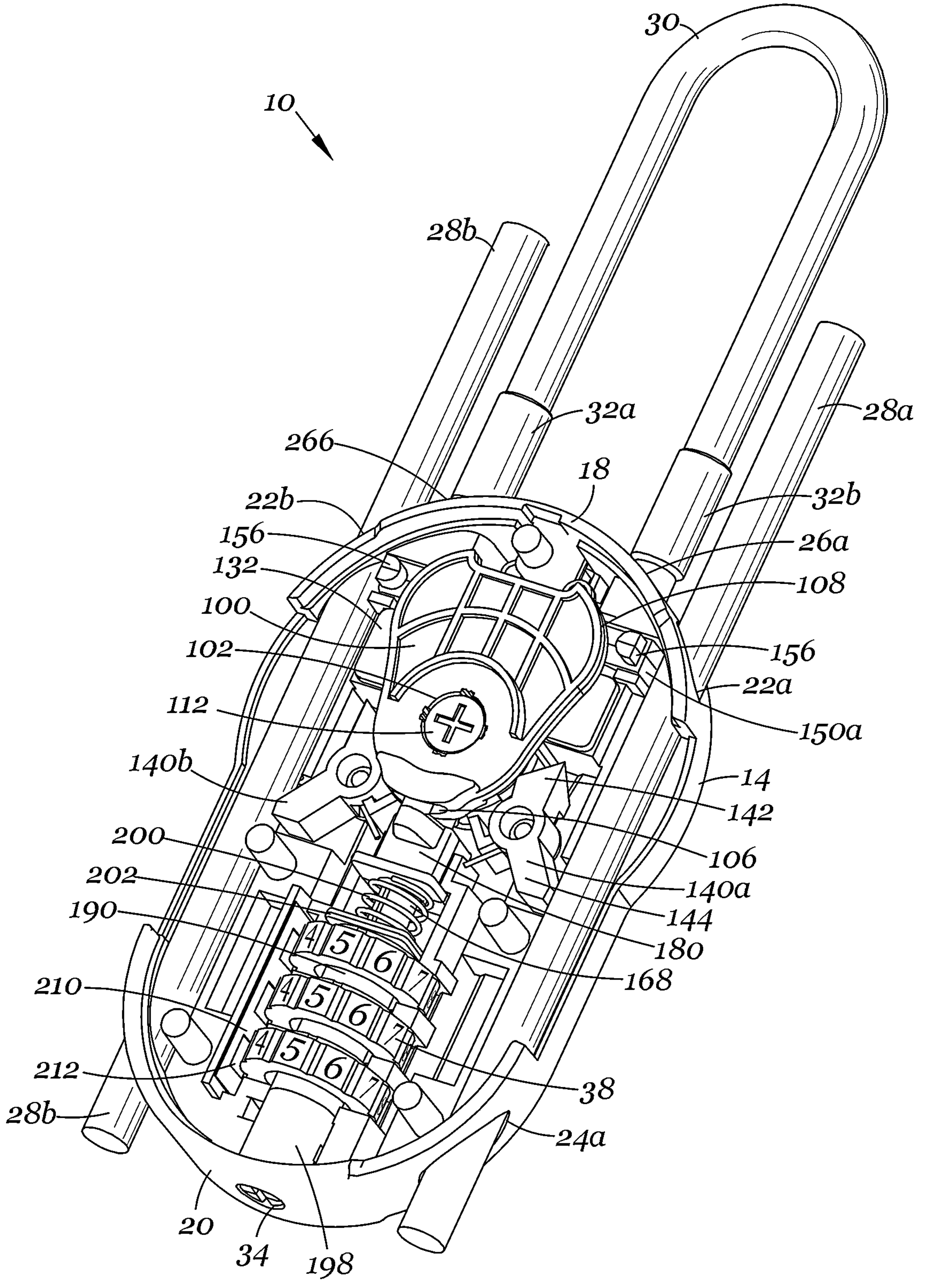
FIG. 5 is a diagram illustrating a perspective view, in simplified form, an exemplary implementation of the interior of the cable lock described herein as viewed with the back shell of the lock body removed.

FIG. 4 is an exploded, perspective view of the cable lock 10 showing the external side of the back shell 16 and the interior of the of the lock body from the back side looking into the interior of the front shell 14. FIG. 5 is another perspective view of the interior of the body from the back side looking into the interior side of the front shell 14. The lock body (12 in FIG. 1) includes the front shell 14 and back shell 16 which are mated together to create the body and are secured together, such as, with rivets, one-way screws (not shown) or other means. The lock body 12 has a first set of two cable orifices 22*a* and 22*b* for slidable cables 28*a* and 28*b*, and a second set of two cable orifices 26*a* and 26*b* for the lockable cable [s] 30 at its first end 18 (also see FIG. 3). The lock body 12 has a third set of two cable orifices 24*a* and 24*b* at its second end 20 for the slidable cables. Orifices 24*a* and 24*b* are in internal communication with the first set of orifices 22*a* and 22*b* within the body. Slidable cables 28*a* and 28*b* enter through cable orifices 24*a* and 24*b*, respectively, run through the lock and exit the body through the first set of orifices 22*a* and 22*b*, respectively or vice versa. Channels for the slidable cables 28*a* and 28*b* are located in the interior of both the front shell 14 and the back shell 16. The front shell has a reset hole 34 giving access to the lock's combination reset assembly as described below.

1.1 Slidable Cables

Referring again to FIGS. 1-5, in the locked state, the lock cannot be slide down the slidable cables, i.e., in the opening direction where the slidable cables enter the third set of slidable cable orifices 24*a* and 24*b* and exit through the first set of slidable cable orifices 22*a* and 22*b*. However, even when the lock is in the locked state, the lock can slide up the slidable cables in the direction of the first end 18, i.e. that is in the direction where the slidable cables enter the first set of orifices 22*a* and 22*b* and exit the third set of orifices 24*a* and 24*b*. The lock 10 in the unlocked state can be slide up or down the slidable cables 28*a* and 28*b*. To accomplish this, the control knob 40 is first depressed to permit the lock to slide down the slidable cables towards the second end 20. Thus, even in the unlocked state, the lock can only be slid down the slidable cables towards the second end, i.e., the opening direction, when a control knob is actuated as described below. The first and third sets of cable orifices 22*a*, 22*b*, 24*a* and 24*b* are in communication through the lock and slidable cable 28*a* runs through orifices 22*a* and 24*a* and slidable cable 28*b* runs through orifices 22*b* and 24*b* as described below.

Both shells 14 and 16 of the body have slots 36 to receive a portion of the outer periphery of the numbered combination wheels 38 as explained below. The exposure of the of the outer periphery of the combination wheels 38 permits each of the wheels to be rotated and aligned to the lock's combination for purposes of unlocking the lock as will be discussed herein. Each wheel can be "numbered" consecutively or randomly. Each wheel can be numbered with Arabic numbers and/or alphabetic letters, and/or other symbols (which for the purposes of this description will sometimes be generically referred to as alphanumeric symbols). In the depicted implementation, each wheel is numbered from 0 to 9 consecutively.

The lock has a control knob 40 located on the front shell 14 that is used to carry out certain operations of the lock as described below. When the combination of the lock is correctly set by aligning the combination wheels 38 with a preset unlock sequence made up of an alphanumeric symbol on the periphery each of the rotatable wheels in the correct order as viewed from the front of the lock in the slots 36, the lock is in its unlocked state and unlocked. When the lock is in the unlocked state, the control knob 40 can be rotated and/or depressed (partially pushed downward into the body). When the combination of the lock in not correctly set, that is when the combination wheels are not aligned with the correct combination numbers in the correct order, the lock is locked, i.e., the lock is in its locked state. When the lock is locked, the control knob 40 cannot be rotated or depressed.

As mentioned previously, the lock can be slid up the slidable cables in the direction of the first end whether the lock is locked or unlocked and without depressing the control knob. When the control knob 40 is depressed which requires the lock to be in the unlocked state with the combination wheels aligned with the correct combination numbers, the lock can be slid down the slidable cables in the direction of the second end 20. When the lock is locked, the control knob 40 cannot be depressed and the lock cannot be slid down the slidable cables in the direction of the second end 20.

The two slidable cables 28*a* and 28*b* can be separate cables or separate sections of a single cable that has both sections running through the lock via cable orifices 22*a* and 22*b* and 24*a* and 24*b*. One section runs through orifices 22*a* and 24*a* and the other section of the slidable cable through orifices 22*b* and 24*b*. The lock can be used to lock the pull cable of a closable bag (such as the bags described previously) where both ends of the pull cable are secured by the lock. Most closable bags have a single cable for closure of the bag opening (often called the "pull cable"). The bags are closed by pulling the two ends of the cable away from the bag which closes off the bag opening. Thus, the two ends of the pull cable can be the two slidable cables 28*a* and 28*b* engaged by the lock as described above. The cable lock permits the two sections of the pull cable to slid through the lock through the orifices 22*a*, 22*b*, 24*a* and 24*b* as described above with respect to the slidable cables 28*a* and 28*b* in the direction of the second end 20 when the lock is in either the locked or unlocked state to permit the bag to be closed by pulling the two ends or leads of the pull cable from the bag and positioning the lock near the entrance/exit of the bag's pull cable to lock the closure of the bag. When the combination is not correctly set, the lock is in the locked state and the control button cannot be depressed and the pull cables cannot be slid out of the lock in the opening direction to loosen or free the pull cable to permit opening of the bag. Thus, the lock can be used to lock a closed bag and prevents the bag from being opened since the pull cable is secured by the lock when locked. However even in the locked state, the sections of the bag's pull cable running through the lock can be slid through the lock in the direction of the second end, the closing direction, as described above permitting the lock to be moved to against the closed bag to secure closure of the bag opening. This permits the bag to be left open with the lock in the locked state. Items can be placed in the open bag, such as items ordered online and delivered by a delivery service. The delivery person can put the item [s] in the open bag, close the bag by pulling the two ends of the pull cable away from the bag, and sliding the lock up the cable sections to the bag. This results in securing closure of the closed bag. Since the lock is locked, no one can slide the lock down the cables in the opening direction to free up sections of the pull cable of the bag to open the bag.

1.2 Lockable Cables

Referring to FIGS. 1-5, when the lock is in its unlocked state, an actuator of a lockable cable release mechanism can be employed to release the terminal ends 32*a*, 32*b* of the lockable cable 30 from the lock. In the implementation depicted in FIGS. 1-5, the actuator takes the form of the control knob 40 which can be rotated to the right (clockwise) or to the left (counterclockwise), although in some implementations which will be described later where one of the terminal ends is permanently fixed, the control knob can only be rotated in one direction. The control knob cannot be rotated when the lock is locked. From the front side of the lock (FIG. 1), when the control knob is rotated to the right (clockwise), the terminal end 32*b* (FIG. 12) for the lockable cable 30 is released by the lock and the terminal end can be removed from the orifice 26*b* (FIG. 3) of the lock. When the control knob is rotated to the left (counterclockwise), the terminal end 32*a* for the lockable cable 30 is released by the lock and the terminal end can be removed from the orifice 26*a*.

When the lock is locked or unlocked and one or both of the orifices 26*a* and/or 26*b* (FIG. 3) are open, i.e., unoccupied by a terminal end 32*a* or 32*b*, a terminal end of a lockable cable can be pushed into the open orifice to be locked. If the terminal end 32*a* or 32*b* is fully pushed in, the terminal end will be engaged by a locking bolt 150*a* or 150*b* and will be latched in the lock. This permits lockable cable 30 to be latched into the lock when the lock is in either the locked or unlocked state. The lockable cables locked into the lock cannot be freed or unlocked from the lock until the lock is unlocked to permit the control knob to be rotated to unlock the terminal ends 32*a* and/or 32*b* from the lock as described herein. The two lockable ends of a lockable cable (FIGS. 1-2 and 4-5) or a single lockable end of a lockable cable having its other end permanently secured to the lock body as described below are secured to a terminal end 32*a* or 32*b*. Referring to FIG. 12, the terminal end 32*a*, 32*b* has a cable connector 64 which receives the end of the cable and is permanently secured to the cable. The terminal end 32*a* or 32*b* has a locking plate 70 at its distal end connected to a shank 68 which is received in the bolt hole 154 of a terminal bolt 150*a* or 150*b* (shown in FIGS. 10 and 11 and described below). The shank 68 extends out from the receiver section 66 which is received in a cable orifice 26*a* or 26*b*. The diameter of the shank is slightly less than the diameter of the cable orifices 26*a* or 26*b* so that the shank can easily slide in and out of the orifices. The lockable cable 30 can be used to secure the lock and anything attached to it (such as a closable bag via the pull cable as described above) to, for example, a door handle assembly, post, pillar, fencing, vehicle, and the like. In the case of a door handle assembly, one end of a locking cable can be passed through a clasp like handle and locked in the lock, and if the other end of the lockable cable is secured or locked to the lock, the lockable cable will secure the lock to the door handle. The lockable cable could also be wrapped around the handle. Thus, the lock can be used to prevent the theft of the closable bag and its contents since the lock and bag are secured to the door by the lockable cable secured to the door handle and locked in the lock and the bag closure is also secured by the lock via its pull cables.

Figure 2:
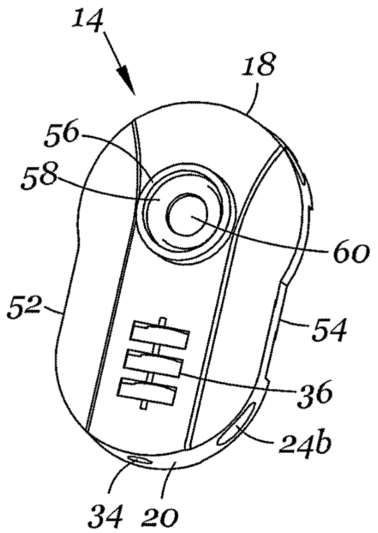
FIG. 2 is a diagram illustrating a perspective top view, in simplified form, of an exemplary implementation of a front shell of the lock body of the cable lock implementations described herein.
Figure 8:
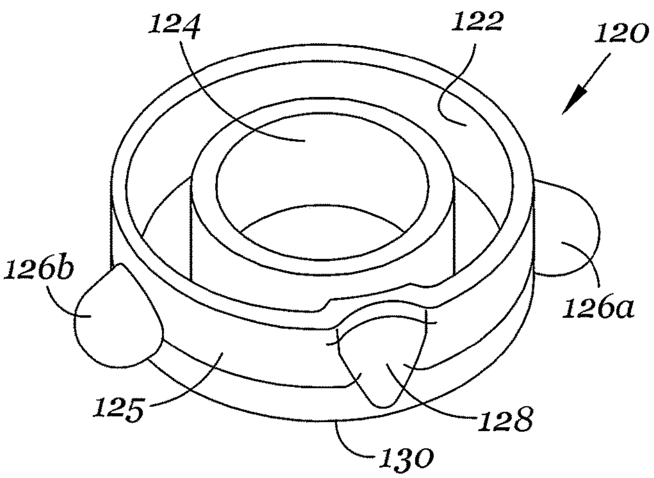
FIG. 8 is a diagram illustrating a perspective front view, in simplified form, of an exemplary implementation of a control ring of the cable lock implementations described herein.

Referring to FIGS. 2, 4, and 5-7, in one implementation, the lockable cable release mechanism includes the following. The control knob shaft 42 of the control knob 40 extends into the lock through the circular hole 60 in the front shell 14 and through a control ring 120 (FIG. 8) within the lock body. The end of the control knob shaft 42 does not extend to the internal surface of the back shell 16 since the control knob shaft requires room within the lock body to permit the control knob to be depressed into the body when the lock is unlocked. The control knob shaft 42 has (1) a collar section 48 which resides in the circular hole 60 and can rotate and slide up and down therein when the lock is unlocked, and (2) a support section 46 which is received in the bore 124 of the control ring 120 (FIG. 8). The support section can rotate in the bore 124 and vice versa and the control ring 120 can slide up and down the support section and vice versa. The end section 44 of the shaft 42 has longitudinal ribs which engage grooves in the bore of the control plate 100. The control ring 120 has a circular groove 122 which receives one end of a spiral compression spring 118. The control ring 120 resides in receiver 74 (FIG. 6) on the inner side of the front shell 14. The control ring 120 can rotate to a limited degree in the receiver 74 and move up or down in the receiver as is described below. The spiral compression spring 118 biases the control ring 120 into the receiver. The control knob 40 is supported by control ring 120 in the lock body for both rotational and longitudinal (control knob depressing) movement. The shelf 50 of the of the control knob shaft rests against the bottom side 130 of the control ring. When the control knob 40 is depressed the shelf 50 is pushed against the bottom side of the control ring and partially pushes the control ring out of its receiver. The depress movement of the control knob is stopped when the bottom side of the control knob handle 41 comes in contact with the floor 58 of the front shell 14 (FIG. 2). As described above the control knob can only be rotated and/or depressed when the lock is unlocked.

The control plate 100 is secured to the end of the control knob shaft 42. The control plate receives the ribbed end section 44 of the shaft 42 of the control knob to secure the control plate to the control knob shaft so that when the control knob 40 is rotated, the control plate is twisted, i.e., rotated, with control knob. The control plate 100 is secured to the end of the control knob shaft by threaded screw 112 which is received in a threaded hole at the end of the shaft 42 [not shown].

The control knob shaft 42 extends through the spiral compression spring 118 that resides between the control plate 100 and the control ring 120. One end of the spring 118 is received in the circular groove 122 of the control ring (FIG. 8) and the other end of the spring rests against the side of the control plate 100 facing the control ring. The spiral compression spring 118 pushes the control plate 100 and the control ring 120 apart. This is needed since the control ring 120 both slides on and rotates over the support section 46 of the shaft 42, and yet maintains contact with shelf 50 of the shaft so that when the control knob 40 is depressed the control ring is pushed towards the back shell 16 of the lock and the two fingers 126*a* and 126*b* of the control ring are pushed against the cable buckles 140*a* and 140*b* as described below. When the control knob 40 is depressed which requires that lock be in the unlocked state, the control knob via shelf 50 pushes the control ring slightly out of the receiver 74 and the control plate 100 is equally and simultaneously pushed toward the interior wall of the back shell 16. The handle 41 of the control knob rides within the circular wall 56 of the front shell 14 (FIG. 2). The control knob 40 can only be depressed to the point where the bottom side of the handle 41 comes in contact with the floor 58 within the circular wall 56. This limits how far the control knob can be depressed into the lock which in turn prevents the control plate 100 from contacting the interior side of the back shell 16 and prevents the control ring 120 from being fully pushed out of the receiver 74.

Figure 6:
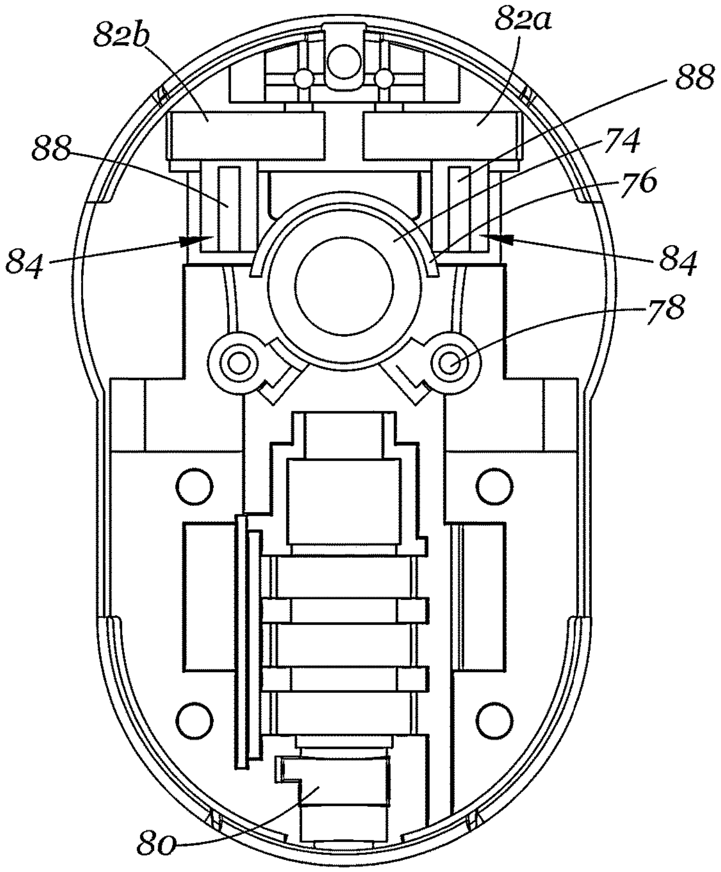
FIG. 6 is a diagram illustrating a plan view, in simplified form, of an exemplary implementation of the interior side of the front shell of lock body.
Figure 7:
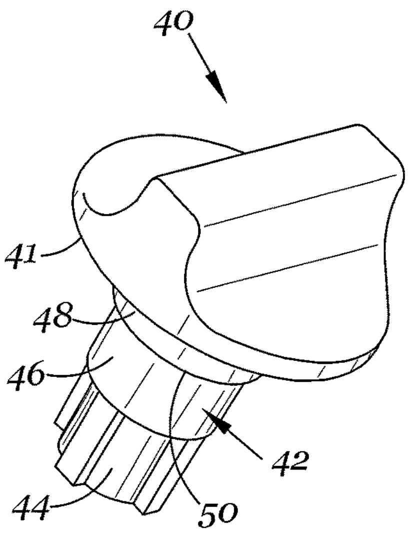
FIG. 7 is a diagram illustrating a perspective top view, in simplified form, of an exemplary implementation of a control knob of the cable lock implementations described herein.

Referring to FIGS. 1, 4-6, 8 and 9, cable buckles 140*a* and 140*b* are positioned on either side of the control ring 120 and each has a bore 146 which is received on one of the shafts 78 extending out from the internal side of the front shell 14 for pivotal movement (FIG. 6). Referring to FIGS. 5, 8 and 9A-C, each cable buckle 140*a*, 140*b* has a cam arm 142 at one end which engages a finger 126*a* or 126*b* of the control ring 120 (FIG. 8) and a cable engagement arm 144 at the opposite end of the cable buckle which engages a slidable cable 28*a* or 28*b* as described herein. Cable buckles 140*a* and 140*b* are mirror images of each other and are not interchangeable and each must be positioned in the lock body as shown in FIGS. 4 and 5. The cable buckles 140*a*, 140*b* are spring loaded by spiral springs 141 and the springs biases the cam arm 142 of each cable buckle against the outer cylindrical side 125 or a finger 126*a*, 126*b* of the control ring. When the lock is locked, the cable engagement arm 144 is pressed against a slidable cable 28*a*, 28*b* (FIG. 5). The engagement arm 144 prevents the slidable cable from being slid toward the first end 18 of the lock unless the control knob 40 is depressed which requires the lock to be unlocked as described below. That is, when the lock is locked the cable engagement arm 144 engages a slidable cable and prevents the cable from being moved through the lock toward the first end 18. As described above, the slidable cables can be slid through the lock toward the second end 20 regardless if the lock is locked or unlocked, that is, the lock can be slid up the slidable cables toward first end 18 when the lock is in the locked or unlocked state. But when the lock is locked, the slidable cables 28 cannot be slid through the lock towards the first end 18 of the lock, that is, the lock cannot be slid down the slidable cables in the direction of the second end 20. The lock can only be slid down the slidable cable towards the second end 20 when the lock is in an unlocked state and the control knob 40 is depressed into the lock.

Figure 9A:
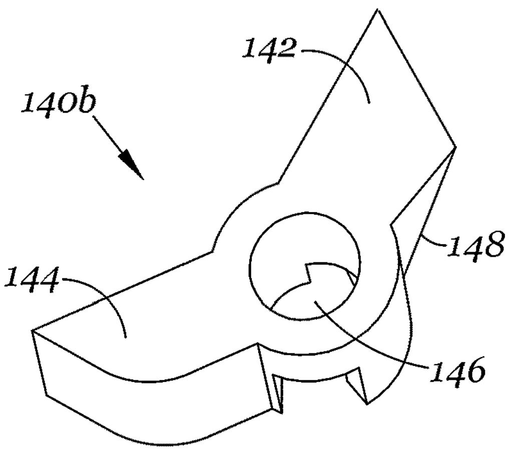
FIGS. 9A-C are diagrams illustrating three perspective views from different angles, in simplified form, of an exemplary implementation of a cable buckle of the cable lock implementations described herein.
Figure 9B:
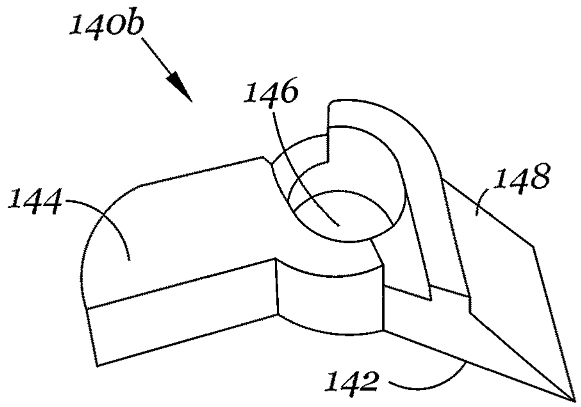
Figure 9C:
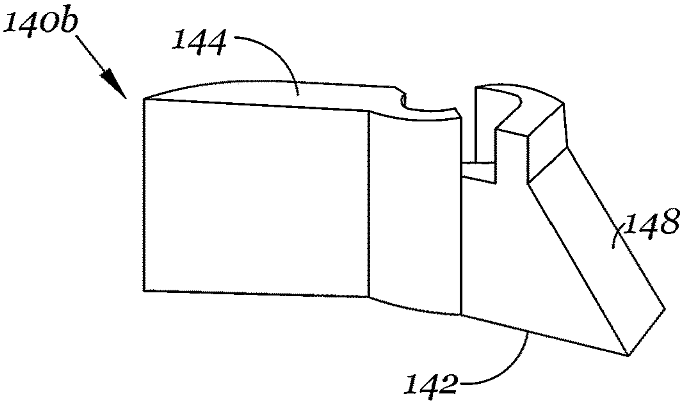

As described above, the control knob 40 cannot be depressed when the lock is locked. When the lock is unlocked and the control knob is depressed, the shelf 50 of the control knob shaft pushes against the bottom side 130 of the control ring 120 and partially pushes the control ring out its receiver 74 in the interior of the front shell 14 towards the back shell 16 that in turn forces the fingers 126*a*, 126*b* of the control ring against a beveled surface 148 of each cam arm 142 of both cable buckles 140*a*, 140*b* (FIGS. 9A-C). The beveled surface 148 of each cam arm slides over a finger 126*a*, 126*b* which pushes the cam arm away from the control ring 120 and pivots the cable engagement arm 144 of each cable buckle 140*a*, 140*b* away from the slidable cables 28*a*, 28*b*. This permits the slidable cables to be slide towards the first end 18 of the lock (the opening direction), that is, it permits the lock to be slid down the cables in the direction of the second end 20 of the lock letting cable enter the second orifices 24*a*, 24*b* and exit the lock out of the first orifices 22*a*, 22*b*. Of course, the control knob 40 can only be depressed into the lock when the lock is unlocked. When the control knob 40 is released, the pressure of the fingers 126*a*, 126*b* against the cam arms 142 is released permitting the cam buckles 140*a*, 140*b* which are spring loaded as described above to rotate so that the cable engagement arms 144 engage the slidable cables 28*a*, 28*b* and prevent the slidable cables from sliding in the opening direction. When the cable engagement arm 144 engages the cable 28*a*, 28*b*, the end of cable engagement arm pushes into the cable and prevents the cable from being slid upward in the direction of the first end 18 of the lock. In addition, the beveled surfaces of the cable buckles 140*a*, 140*b* push against the fingers 126 of the control ring 120 and push the control ring fully back into the receiver 74.

Figure 10:
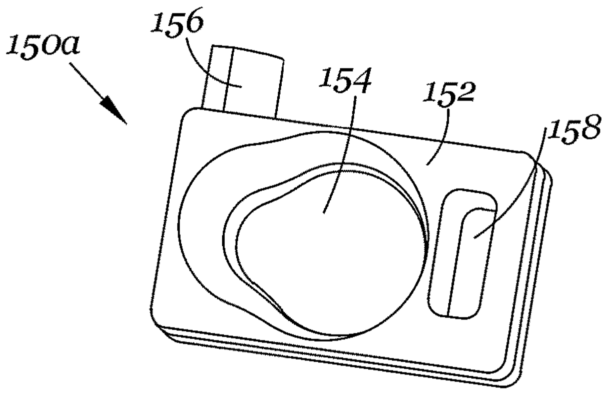
FIG. 10 is a diagram illustrating a perspective view, in simplified form, of an exemplary implementation of a first side of a terminal buckle of the cable lock implementations described herein.
Figure 11:
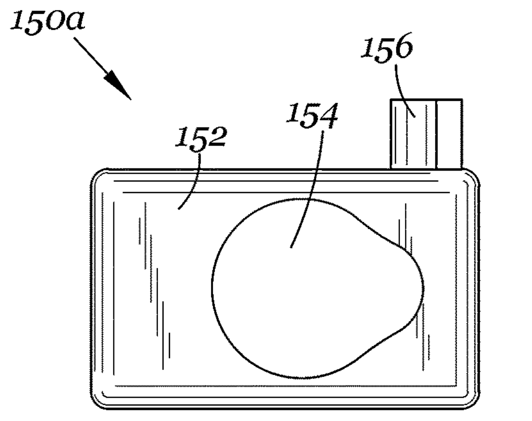
FIG. 11 is a diagram illustrating a plan view, in simplified form, of an exemplary implementation of a second side of the terminal buckle of FIG. 10.
Figure 12:
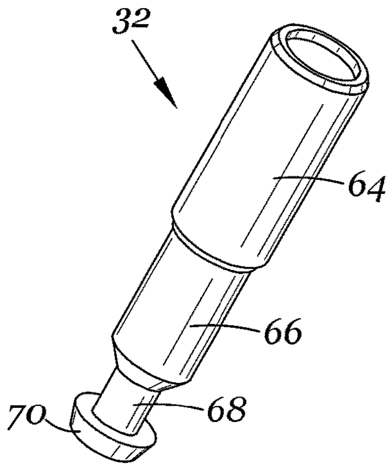
FIG. 12 is a diagram illustrating a perspective view, in simplified form, of an exemplary implementation of a terminal end for a locking cable of the cable lock implementations described herein.
Figure 13:
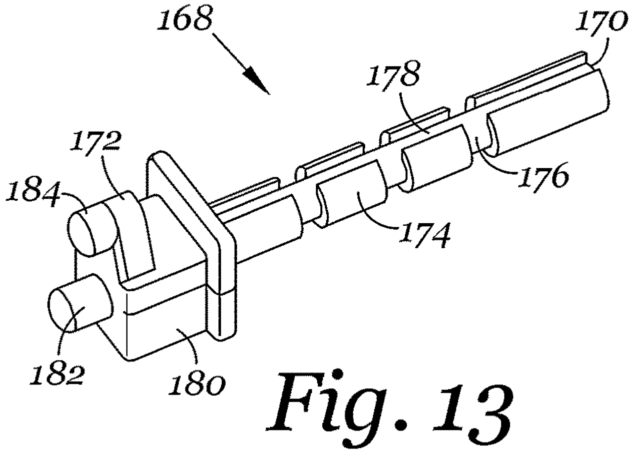
FIG. 13 is a diagram illustrating a perspective view, in simplified form, of an exemplary implementation of a lock core of the cable lock implementations described herein.
Figure 14:
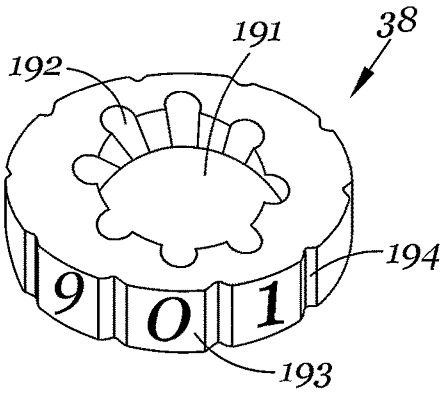
FIG. 14 is a diagram illustrating a perspective view, in simplified form, of an exemplary implementation of a numbered combination wheel of the cable lock implementations described herein.
Figure 15:
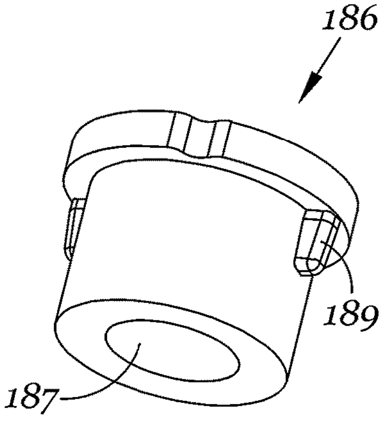
FIG. 15 is a diagram illustrating a perspective view, in simplified form, of an exemplary implementation of a support sleeve for the numbered combination wheel of FIG. 14.
Figure 16:
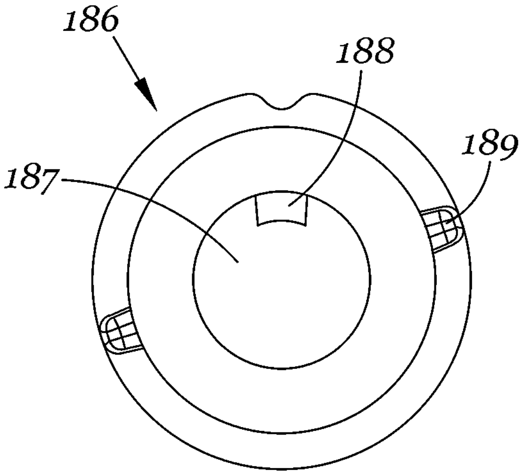
FIG. 16 is a diagram illustrating an end plan view, in simplified form, of an exemplary implementation of the support sleeve of FIG. 15.

Referring to FIGS. 1, 4-6 and 10-11, terminal bolts 150*a* and 150*b* are received in bolt slots 82*a* and 82*b* respectively (FIG. 6). The bolt slots 82*a*, 82*b* are in the interior surface of the front shell 14. Each terminal bolt 150*a* and 150*b* can move in its bolt slot 82*a*, 82*b* from one end of the slot to the other end of the slot as described below. Terminal bolt 150*a* is on the first side 52 of the lock within the body, and terminal bolt 150*b* is on the second side 54 of the lock within the body of the front shell. The terminal bolts 150*a* and 150*b* are mirror images of each other and are not interchangeable. Terminal bolt 150*a* is shown in FIGS. 10 & 11. Terminal bolt 150*b* is the mirror image of terminal bolt 150*a* but is otherwise identical is size, shape and design. The terminal bolts are spring loaded with spiral springs 151 with one arm of each spring engaging the slot 158 in the terminal bolts. The springs 151 force the terminal bolts to the inner ends of the bolt slots 82*a*, 82*b* in the middle of the interior of the front shell 14. When a terminal end 32*a* or 32*b* is inserted into a cable orifice 26*a* or 26*b* and pushed fully in, the locking plate 70 and shank 68 (also see FIG. 12) enter the bolt hole 154 of a terminal bolt 150*a* or 150*b* in the entry side shown in FIG. 10. The locking plate 70 passes through the bore 154 (also called bolt hole) and exits on the locking side (also see FIG. 11) of terminal bolt. The shank 68 resides in the bore 154 and the terminal bolt 150*a* or 150*b* which is under spring pressure slides towards the center of the lock body whereby the locking plate 70 engages the wall of the terminal bolt locking the terminal end 32*a*, 32*b* in the lock. The terminal bolt 150*a*, 150*b* can only be moved when the lock is unlocked and the control knob 40 can be properly rotated to rotate the control plate 100 which engages the cam finger 156 and moves the cam finger and the terminal bolt toward the side 52 or 54 of the lock body to free the locking plate 70 from the wall of the locking side of the of the terminal bolt 150*a*, 150*b*. When the locking plate 70 is free of the wall of the terminal bolt, it is pushed into the bore 154 of the terminal bolt by a hollow piston 160 which is under pressure from coil compression spring 164 (see FIG. 4). The terminal end 32*a* or 32*b* of the attached lockable cable can now be pulled to pull the terminal end out of the lock body 12. The hollow piston 160 remains in the bore 154 of the terminal bolt 150*a* or 150*b* and keeps the bore in alignment with the cable orifice 26*a*, 26*b* it is associated with. When a terminal end 32*a* or 32*b* of a lockable cable 30 is inserted into the lock body through a cable orifice 26*a* or 26*b*, the terminal end forces the hollow piston 160 out of the bore 154.

Still referring to FIGS. 4-6, each bolt slot 82*a*, 82*b* is in communication with the front end of a longitudinal slot 84. The back end of each longitudinal slot 84, the end closest to the second end 20 of the lock, is walled off. Each longitudinal slot 84 receives a hollow piston 160 and coil compression spring 164 as shown in FIG. 4. Each hollow piston 160 is open at its back end and walled off at its front end with a front wall. One end of the compression spring 164 resides in the hollow piston 160 with the end of the spring engaging the inner side of the front wall of the piston. The other end of each spring 164 engages the wall of the back end of a longitudinal slot 84. The coil compression springs 164 forces the hollow piston 160 in a longitudinal slot 84 against the locking plate 70 when a terminal end 32*a*, 32*b* is in the bolt hole 154 and into the bolt hole when the terminal end is withdrawn from the bolt hole. A retainer 132 with a top plate 134 and base 136 are employed to retain the hollow pistons 160 and the coil compression springs 164 in the longitudinal slots (FIG. 4). In addition, a guide tab 86 projects outward from the external wall of each hollow piston 160 adjacent its open back end (as best seen in FIG. 4). This tab 86 is captured in a trough 88 that runs along the bottom of each longitudinal slot 84 (as best seen in FIG. 6). The tab 86 and trough 88 combination keep the hollow pistons 160 from rotating or canting in the slots 84.

Referring to FIGS. 10 and 11, each terminal bolt 150*a*, 150*b* has a body 152 with an entry side (shown in FIG. 10) and opposing locking side (shown in FIG. 11), a cam finger 156 extending out of the top of the body 152, and a bore or bolt hole 154 extending through the bolt from the entry side to the locking side. The entry side faces the cable orifice 26*a* or 26*b*, which extends from the exterior of the lock body into the lock body (FIG. 5). The bore 154 has an elongated shape and a tapered entry on the entry side to guide the terminal end 32*a* or 32*b* into the bore. As mentioned above the terminal bolt 150*a*, 150*b* can slide from one end to the other end of the bolt slot 82*a*, 82*b* they reside in and terminal bolts are spring loaded such that each terminal bolt is pushed inward in the slot towards the inner wall of each slot, that is towards the middle of the lock body. When the cable orifice 26*a* or 26*b* is free of a terminal end 32*a*, 32*b* of a lockable cable 30, the bore 154 of the terminal bolt 150*a* or 150*b* associated with that cable orifice is occupied with a hollow piston 160 and the bolt cannot be slid in its bolt slot 82*a* or 82*b*. The hollow piston 160 occupies the bore 154 in place of the terminal end 32*a* or 32*b* to align the bore with the cable orifice 26*a* or 26*b* so that a terminal end can be inserted into the cable orifice to lock the terminal bolt in the lock as described herein. The bolt 150*a*, 150*b* can only be slid in its bolt slot 82*a*, 82*b* by rotating the control knob 40 in the proper direction when there is a terminal end 32*a*, 32*b* in the terminal bolt. When a terminal end 32*a*, 32*b* is locked in a terminal bolt 150*a*, 150*b*, the shank 68 resides in the bore 154. The shank 68 has a smaller diameter than the bore 154 and the bore is oblong which provides room in the bore to permit the bolt 150*a* or 150*b* to be slid towards the closet side of the lock body to unlock the terminal end 32*a* or 32*b* from the bolt. The cam surface 108 of the control plate 100 engages the cam finger 156 of a terminal bolt 150*a*, 150*b* when the lock is unlocked and the control knob 40 is rotated in the direction of the bolt (see FIG. 5). When the cam surface 108 engages a cam finger 156 of a terminal bolt 150*a*, 150*b*, it slides the bolt towards the closest side of the lock body which moves the bolt hole 154 thereby permitting the piston 160 engaging the end of the terminal end 32*a*, 32*b* of the lockable cable 30 in the bolt hole to push the terminal end 32*a*, 32*b* out of the bolt hole freeing the terminal end of the lockable cable. The hollow piston 160 remains in the bore 154 until a terminal end 32*a*, 32*b* is inserted into the lock through the cable orifice 26*a*, 26*b* to lock the terminal end in the lock.

1.3 Operation of the Cable Lock in the Locked and Unlocked States

In one implementation, the operation of the cable lock in the locked and unlocked states involves the following. The lock core 168 has a shaft 174 with a cam body 180 at one end and an opposite end that receives the a reset cap 198 described below. The cam body 180 has a cam arm 172, locking finger 182 and a cam finger 184. The locking finger 182 engages the locking groove 128 of the control ring 120 (FIG. 8). When the lock is in the locked state, the locking finger 182 in the locking groove 128 prevents rotation of the control ring and movement of the control ring out of the receiver 74 (FIGS. 6 & 8). The cam finger 184 extends longitudinally out of the cam arm 172 of the cam body and is parallel to the locking finger 182. The cam finger 184 engages the slot 106 in the back side of the control plate 100 (FIG. 4). When referring to front or back side or end of a lock part in this description, the front end or front side of a part is side or end of the part facing the first end 18 of the lock and the back side or back end of a part is the side or end of the part facing towards the second end 20 of the lock. When the lock is in the locked state, the lock core 168 cannot be longitudinally moved because at least one bore finger 188 of a support sleeve 186 is positioned in a circumferential groove 176 of the lock core. This prevents the control knob from being depressed because it cannot push the control ring 120 partially out of the receiver 74 because the control ring cannot push the locking finger 182 of the lock core out of the of the locking groove 128 of the control ring. Moreover, when the lock is locked, the lock core 168 cannot be rotated and in turn the cam arm 172 and the cam finger 184 cannot be rotated because the control knob 40 cannot be rotated as described above. When the control knob 40 cannot be rotated, the control plate 100 cannot be rotated since it tied to the control knob by the control knob shaft 42. When the control plate 100 cannot be rotated, the cam finger 156 of the lock core cannot be moved from side to side and this prevents rotation of the lock core. Moreover, when the control plate 100 cannot be rotated, the control plate cannot slide the terminal bolts 150*a*, 150*b* in the slots 82*a*, 82*b*, and the terminal ends 32*a*, 32*b* of the lockable cables cannot be unlocked as described above. When the lock core 168 cannot be rotated, the cam finger 184 cannot be moved side to side. This in turn prevents rotation of the control plate 100 since the cam finger 184 engages the locking slot 106. It also prevents rotation of the control knob 40 which is secured to the control plate 100 by the control knob shaft 42. Even when the control plate 100 can be rotated when the lock is unlocked, the rotational freedom of the control plate and the control knob 40 are limited by the cam fingers 156 of the terminal bolts 150*a*, 150*b* (FIGS. 5, 10 & 11).

When the lock is in the unlocked state, the lock core 168 is free to rotate to the extent the cam arm 172 and cam finger 184 can be rotated. The cam finger 184 engages the slot 106 of the control plate 100 and the slot limits the side to side or rotation of the cam finger which in turn limits the rotation of the cam arm 172, which in turn limits rotation of the lock core 168. When the lock core 168 can rotate, the cam finger 184 can rotate side to side permitting the control plate 100 to be rotated side to side when the control knob 40 is rotated. As explained above, the rotation is limited by the cam fingers 156 of the terminal bolts 150*a*, 150*b*. When the lock is in the unlocked state and the control knob 40 is rotated, the control plate 100 is rotated to the same extent and the cam finger 184 and cam arm 172 are rotated, which in turn rotates the lock core 168.

The following is a description of certain elements of the lock from a view looking down into the interior of the front shell 14 (FIGS. 4 and 5). As indicated previously, when the lock is unlocked the lock core 168 can rotate permitting the control plate 100 to be rotated. In the unlocked state, the control knob 40 and control plate 100 can be rotated and when the control knob is rotated it rotates the control plate. When the front portion of the control plate 100 (the portion closest to the first end 18) rotates to the right or left (clockwise or counterclockwise), the slot 106 in the back portion of the control plate 100 rotates to the left or right respectively, and in turn the cam finger 184 in the slot 106 is moved or rotated to the to the left or right respectively. This in turn rotates the lock core 168 left or right (counter-clockwise or clockwise respectively).

As described previously, when the lock is locked, the lock core 168 cannot be rotated and the cam finger 184 cannot move or rotate. This prevents the control plate 100 from being rotated, which in turn prevents rotation of the control knob 40 to unlock one of the lockable cable's terminal ends 32*a* or 32*b* as described above. When the lock is in the unlocked state, the lock core 168 can rotate and the cam finger 184 can be moved or rotated, thereby permitting the control plate 100 to be rotated and the control knob 40 to be rotated. When rotated, the control knob 40 rotates the control plate 100 which permits the unlocking of the lockable cable's terminal ends 32*a* or 32*b* from the lock as described above.

Referring to FIGS. 1, 4, 5, and 13-16, the lock can only be slid down the slidable cables 28*a*, 28*b* in the direction of the second end, the opening direction, when the control knob 40 is depressed. The lock must be unlocked to depress the control knob 40. The control knob 40 can only be depressed into the lock as described above when the control ring 120 can be partially pushed out of receiver 74 by the control knob. The control ring 120 can only be pushed out of the receiver 74 by the control knob 40 when the lock is in the unlocked state. In the locked state, the lock core 168 cannot be moved longitudinally and accordingly the locking finger 182 of the lock core cannot be pushed out of the locking groove 128 of the control ring. This prevents the movement of the control ring 120 out of the receiver 74. In the unlocked state, a slidable cable release mechanism releases the slidable cables 28*a*, 28*b* so they can be slid through the lock in the direction of the second end 20. In the implementation depicted in FIGS. 1, 4, 5, and 13-16, the slidable cable release mechanism operates as follows. The lock core 168 is moved longitudinally towards the second end 20. This permits the control knob 40 to be depressed, which partially pushes the control ring 120 out of receiver 74, which in turn pushes the locking finger 182 out of the locking groove 128 in the control ring, which in turn moves the lock core 168 longitudinally towards the second end 20. When the lock is locked, the lock core 168 and locking finger 182 cannot be moved longitudinally toward the second end 20. The locking finger 182 is engaged with the locking groove 128 which prevents the control ring 120 from being partially pushed out of the receiver 74 and that prevents the control knob 40 from being depressed since it engages the control ring.

1.4 Combination Lock Implementations

In various implementations, a combination lock assembly is employed to lock and unlock the cable lock. Referring to FIGS. 1, 2, 4-6 and 13-16, one implementation of the combination lock assembly includes the lock core 168 (FIG. 13), three numbered combination wheels 38 (FIG. 14), three support sleeves 186 (FIGS. 15 & 16) that support the combination wheels on the lock core and which rotate on the lock core when the combination wheel is rotated, and a reset assembly. The lock core 168 supports three support sleeves 186 which in turn support three numbered combination wheels (also called combination wheels) 38. A compression spring 200 and a spring plate 202 are received on the lock core 168 between the cam body 180 of the lock core and the numbered combination wheel 38 with its support sleeve 186 closest to the cam body. The support sleeve 186 and combination wheel 38 are separated from the compression spring 200 by the spring plate 202 to permit the support sleeve and combination wheel to rotate without engaging the end of the spring 200. The support sleeves 186 are mounted on the lock core 168 and are in line, with the middle support sleeve in contact with the other two. The end of the lock core 168 is received in the reset cap 198 and can rotate and move longitudinally in and out of the of the reset cap. As described herein, when the lock is in the unlocked state, the lock core 168 can be rotated and longitudinal moved within limits as described. Thus, when the lock is unlocked, the lock core 168 can slide into and out of, and rotate within, the reset cap 198. The reset cap 198 is received in the reset hole 34 of the lock body. The compression spring 200 pushes against the spring plate 202 to push the cam body 180 of the lock core towards the control ring 120 and the back end of the control plate 100. The results in the engagement of the locking finger 182 with the locking groove 128 of the control ring and engagement of the cam finger 184 with the slot 106 of the control plate as described above. The support sleeves 186 and combination wheels 38 are in contact in line on the lock core 168, with the support sleeve and combination wheel farthest from the cam body 180 in contact with the reset cap 198, and with the support sleeve and combination wheel nearest the cam body 180 in contact with the spring plate 202. The lock core 168 cannot be rotated or longitudinally moved when the lock is locked which prevents movement of the control ring 120 and the control plate 100 as described above. When the lock is unlocked, the lock core 168 can be rotated to a limited degree and longitudinally moved towards the first end and second end with the end of the lock core sliding in the reset cap 198. This freedom of movement of the lock core 168 permits the control ring 120 and control plate 100 to be moved as described, which in turn permits the control knob 40 to be depressed and rotated as described above to permit the slidable cables 28*a*, 28*b* to be moved in the opening direction and the terminal ends 32*a*, 32*b* of the lockable cable or lock shackle to be unlocked and removed from the lock.

The lock core 168 has a longitudinal groove 178 running down its length as well as three circumferential grooves 176. The support sleeves 186 have a central bore 187 and are received on the lock core 168 via their central bore. Each support sleeve 186 has a bore finger 188 in its central bore extending inward. The cam finger 184 on cam body 180 of the lock core 168 engages cam slot 106 of the control plate 100, as described above. When the lock is in the locked state, the control knob 40 cannot be rotated as described above which in turn prevents the control plate 100 from being rotated. This in turn prevents rotation of the lock core 168 via rotation of the cam body 180 via the engagement of the cam finger 184 in the cam slot 106 of the control plate 100. When the lock is in the unlocked state, the lock core 168 and cam body 180 can be rotated. Thus, the control knob 40 can be rotated, which in turn rotates the control plate 100, which in turn moves or rotates the cam finger 184 in the cam slot 106. This is possible because in the unlocked state the lock core 168 can be rotated or moved longitudinally. However, the lock core 168 cannot be simultaneously rotated and moved longitudinally. In the unlocked state, when the lock core 168 is not moved longitudinally, the lock core is free to rotate because the bore fingers 188 in the bores 187 of the support sleeves 186 (FIG. 16) are aligned with and can ride in the circumferential grooves 176 of the lock core and can freely slide through the grooves as the lock core is rotated. When the lock is unlocked and the control knob 40 is depressed causing the longitudinal movement of the lock core 168 via the locking finger 182 and locking groove 128, the lock core cannot be rotated because the bore fingers 188 are now in the longitudinal groove 178, and not aligned with the circumferential grooves 176 of the lock core. When the lock is unlocked and the control knob 40 is not depressed, the support sleeve fingers 188 are aligned with the circumferential grooves 176 of the lock core, and the lock core 168 can be rotated.

Each numbered combination wheel 38 has a central bore 191 (FIG. 14) and is supported by a support sleeve 186. The support sleeve 186 is received in a central bore 191 of a combination wheel. The bore finger 188 of each support sleeve is aligned with and can slide in the longitudinal groove 178 of the lock core 168 when the combination wheel 38 attached to a support sleeve is correctly positioned by a specific number, letter, or symbol (a lock combination) in the combination wheel's slot 36 in the front side of the front shell 14 of the lock body. When all three of the combination wheels 38 are positioned by their correct number, letter, or symbol, the lock core 168 can be moved longitudinally in the central bore 187 of the support sleeves since the external fingers 189 of the support sleeves are aligned with the longitudinal groove 178 of the lock core.

If one or more numbered combination wheels 38 are not positioned correctly by number in the slots 36 of the front shell, the bore finger 188 of each support sleeve for such numbered combination wheels will not be aligned with the longitudinal grove 178 of the lock core. This prevents the lock core 168 from being moved longitudinally in the bores 187 of the support sleeves. As described above, the locking finger 182 of the lock core engages the locking grove 128 of the control ring 120 and prevents the control ring from being moved out of its receiver 74 and thus prevents the control knob 40 from being depressed as described above. The control knob 40 can only move the control ring 120 out of its receiver 74 when the locking finger 182 is free to move longitudinally toward the second end 20 to permit the locking finger to be forced out of the locking groove 128 of the control ring as the control ring 100 is pushed out of its receiver 74 when the control knob 40 is depressed. The locking groove 128 has a slanted shape to permit the locking finger 182 to slide out of the groove when the control ring 120 is partially pushed out of its receiver 74. As described above, the control ring 120 is not fully pushed out of its receiver 74 when the control knob 40 is depressed into the lock.

Referring to FIGS. 1, 4-6, and 14-17, the outer side or edge 193 of the numbered combination wheels 38 have ten areas separated by outer side groves 194. In the depicted implementation, the ten areas are consecutively numbered from 0 through 9. As mentioned earlier, the wheels 38 can be numbered differently or marked with other symbols. Each support sleeve 186 is slid into the bore 191 of a separate wheel 38 and the external fingers 189 on the outer side of each support sleeve engages a bore groove 192 of a wheel 38. During assembly, the compression spring 200 is slid onto the shaft 174 from the shaft end 170 down to the cam body 180. The spring plate 202 follows next and then the three sets of support sleeves 186 with the combination wheels 38.

The sleeves 186 can be inserted one at time with a combination wheel 38 inserted between each support sleeve. Each support sleeve 186 slides in the bore 191 of its companion combination wheel 38. The reset cap 198 is the last element installed onto the shaft and resides at the end 170 of the shaft. These elements rest against each other on the shaft and are spaced such that the outer edges of the combination wheels 38 are aligned to fit through the wheel slots 36 in the front and back shells 14 and 16 of the lock body (FIGS. 1 & 2). As long as the control knob 40 is not depressed, the combination wheels 38 can be rotated in the wheel slots 36. The reset cap 198 is positioned in the reset hole 34 and the spring 200 pushes against the three combination wheels 38 and support sleeves 186, which in turn push the reset cap 198 into the reset hole.

When the combination wheels bear the numbers 0 through 9, the lock combination can be any three numbers from 0-0-0 thru 9-9-9. The lock combination can be reset as described below and there are one thousand possible combinations. Although in various implementations, a portion of the circumferential surfaces of the combination wheels 38 are visible in the slots 36 in both the front and back shells 14 and 16 of the lock, the lock combination is normally entered by rotating each wheel 38 and aligning the correct combination number in the correct sequence in the wheel slots 36 of front shell 14 of the lock (FIG. 1). To prevent the wheels 38 from rotating freely, a plate 210 with spring tabs 212 is positioned in the lock body 12 next to the combination wheels 38 (FIGS. 4 and 5). The spring tabs 212 engage the grooves 194 in the outer edge 193 of the combination wheels 38 to prevent the combination wheels from freely rotating on the lock core 168. The wheels 38 are rotated to move the numbers on the outer edge exposed in the slots 36. As mentioned above, the combination wheels 38 cannot be rotated when the control knob 40 is depressed because the lock core 168 is moved longitudinally toward the second side 20, which moves the circumferential grooves. When the lock core 168 is longitudinally moved, the support sleeve bore fingers 188 are no longer aligned with the circumferential grooves 176 of the lock core.

The combination of the lock is reset with the previously described combination reset assembly. The reset cap 198 is disposed on the end 170 of the shaft of the lock core 168. The lock core 168 can move longitudinally in and rotate in the reset cap 198. As best shown in FIG. 4, the closed end of the reset cap 198 has one or more grooves 206 to receive a screwdriver or the like. The closed end of the reset cap 198 is located in the reset hole 34 of the front shell 14 to give access to the grooves 206. The end of the reset cap 198 opposite its closed end rests against the support sleeve 186 closest to it. All the support sleeves 186 are in contact but each can freely rotate without rotating the other support sleeve(s) they are in contact with. The reset cap 198 has a node 208 which is received in node slot 80 (FIG. 6) during the combination reset operation.

To reset the combination of the lock, the current combination of the lock is set with the combination wheels. A screwdriver is inserted into a grove 206 of the lock cap 198. Employing the screwdriver, the reset cap 198 is pushed inward into the lock body 12 and rotated counter-clockwise to have the node 208 slide into the node slot 80, which locks the cap in the reset position. The reset cap 198 engages the closest support sleeve 186. When the reset cap 198 is pushed to the reset position it pushes the three support sleeves 186 in the direction of the first end 18 and partially moves the support sleeves out of the bores 191 of the combination wheels 38 and the bore fingers 188 of the sleeves disengaged from the bore grooves 192 of the combination wheels. The wheels 38 can now rotate freely upon their respective support sleeves 186. Since the lock combination has been set prior to pushing the reset cap 198 and support sleeves 186 to the reset position described above, the bore fingers 188 of the support sleeves are aligned with the longitudinal groove 178 of the lock core 168 permitting the lock core to be moved to the reset position. When the support sleeves 186 are in the reset position the, bore fingers 188 of the support sleeves are not aligned with the circumferential grooves 176 of the lock core which prevents the support sleeve from being rotated on the lock core 168. Thus, the combination wheels 38 can be rotated to new combination numbers as viewed in slot 36 while their respective support sleeves 186 remain fixed with regard to their rotational position. Although the reset cap 198 and support sleeves 186 are moved longitudinally to their reset position, the combination wheels 38 are not moved longitudinally and remain in position because opposing portions of the wheels are in the slots 36 of the front and back shells 14 and 16 which keeps the wheels longitudinally in position when their respective support sleeves are moved longitudinally to the reset position.

The combination wheels 38 can be rotated to selected numbers visible through the wheel slots 36 to reset the combination. Each wheel 38 can be rotated to enter a chosen number centered in its slot 36 in the front shell 14. In some implementations, the combination can also be reset from the back side since the back shell 16 has slots 36 identical to the slots in the front shell 14. A combination set from the front of the lock will read differently when viewed from the back side and vice versa. Once the combination has been reset, the reset operation is reversed. That is, the screwdriver is inserted into a groove 206 of the reset cap 198 through reset hole 34 and the screwdriver is turned clockwise which rotates the node 208 out of the node slot 80 freeing the reset cap for longitudinal movement. The compression spring 200 forces the support sleeves 186 back into the bores 191 of the combination wheels and the external fingers 189 of the support sleeves engage the bore grooves 192 of the combination wheel and moves the reset cap 198 back into its normal position, or non-reset position, in the reset hole 34. The reset cap 198 has a shoulder 199 that engages the edge portion of the reset hole 34 in the interior of the lock body, which prevents the reset cap from sliding out of the reset hole and keeps the reset cap and the end of the lock core 168 in position.

It is noted that while the combination lock implementations described above employ three numbered combination wheels, it is also envisioned that implementations with four or more wheels are feasible.

1.5 Lockable Cable with Permanently Secured Terminal End

The lockable cable 30 disclosed above has both ends locked in the cable orifices 26*a* and 26*b*. In the unlocked state, the lock can free both terminal ends 32*a*, 32*b* in the cable orifices 26*a* and 26*b* by rotating the control knob 40 first one way and then the other way, or free just one terminal end 32*a* or 32*b* by rotating the control knob in one direction only. In another implementation, the lock can have the end (e.g., 32*a*) of a lockable cable 30 permanently secured in the lock leaving the other terminal end (e.g., 32*b*) lockable and unlockable. In one implementation, this is accomplished by using a terminal bolt (e.g., 150*a*) without a cam finger to receive and retain the terminal end (e.g., 32*a*) of a lockable cable as described above. Without a cam finger the control plate 100 cannot move the terminal bolt (e.g., 150*a*) and the terminal end (e.g., 32*a*) is permanently locked in the bolt unless the lock is disassembled.

Figure 17:
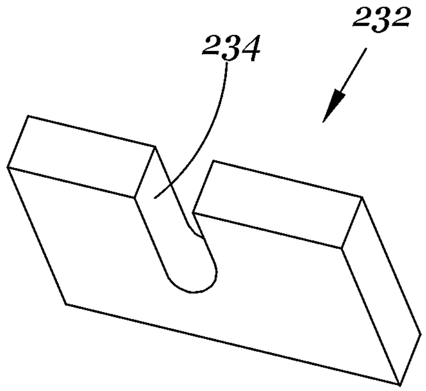
FIG. 17 is a diagram illustrating a perspective view, in simplified form, of an exemplary implementation of a fixed bolt of some of the cable lock implementations described herein.
Figure 18:
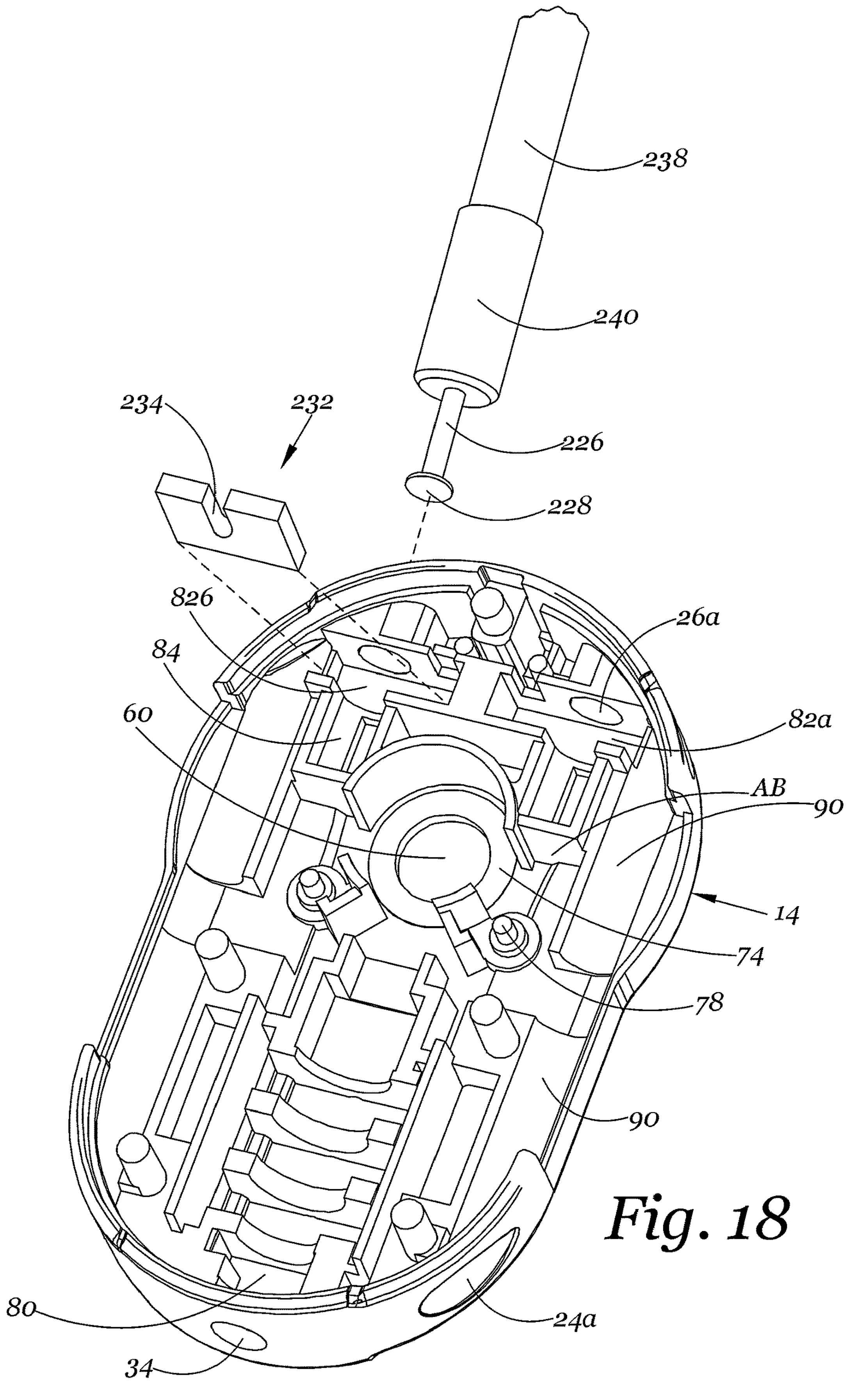
FIG. 18 is a diagram illustrating a perspective view, in simplified form, of an exemplary implementation of the interior side of the front shell of lock body with a fixed bolt to permanently secure one end of a lockable cable.

Referring to FIGS. 17 and 18, in an alternate implementation, a lockable cable 30 can have one end permanently secured to the lock by employing a fixed bolt 232 in a bolt slot 82. The fixed bolt 232 has a groove 234 for receiving a cylindrical arm 226 secured to the end of a cable 238 by a cable collar 240. The fixed bolt 232 fits snugly in the bolt slot 82 and is approximated the same length as the bolt slot. Thus, the fixed bolt 232 cannot move longitudinally in the slot 82 like a terminal bolt 150*a*, 150*b* as described above. When the lock is assembled, the cylindrical arm 226 is placed in the groove 234 of the fixed bolt. A retainer end cap 228 attached to the end of the cylindrical arm 226 prevents the end of the cable 238 from being removed from the groove 234 and bolt 232. The retainer plate 132 (see FIG. 4) prevents the cylindrical arm 226 from slipping out of the top of the groove 234 when the lock is fully assembled. Alternatively, the fixed bolt 232 with the cylindrical arm 226 in the groove 234 can be placed in the slot 82 with the groove facing the floor of the slot during fabrication to keep the cylindrical arm in the groove.

1.6 Lock Shackle Implementations

Figure 19:
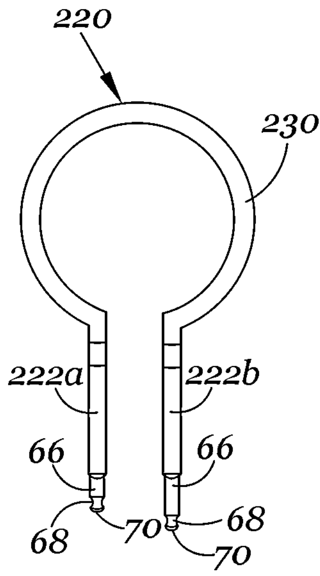
FIG. 19 is a diagram illustrating a plan view, in simplified form, of an exemplary implementation of a removable shackle for use in the cable lock implementations described herein in lieu of a lockable cable.
Figure 20:
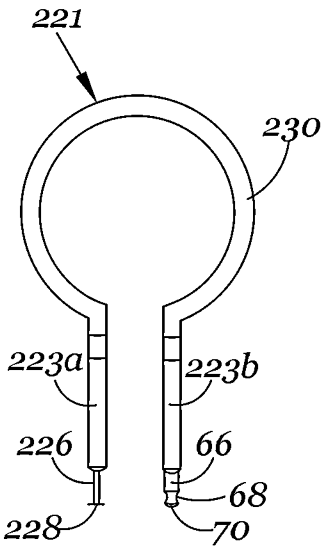
FIG. 20 is a diagram illustrating a plan view, in simplified form, of an exemplary implementation of a rotatable shackle for use in the cable lock implementations described herein in lieu of a lockable cable.

Referring to FIGS. 19 and 20, a lock shackle 220, 221 is shown which can be used in the cable lock in place of lockable cables. In general, the lock shackle is a rod that is bent so that the two ends of the rod are parallel. In one implementation shown in FIG. 19, the shackle is a U-shaped removable shackle 220 where both legs 222*a*, 222*b* of the shackle can be unlocked via a shackle release mechanism (which in one implementation is the same as the cable release mechanism described previously) and the shackle totally removed from the lock. Referring to FIGS. 1, 4 and 19, when the removable shackle 220 is removed from the lock, that is when both locking legs 222*a*, 222*b* of the shackle are unlocked from the lock and removed from the orifices 24*a* and 24*b* (which will be referred to as shackle orifices for the purposes of the description of the lock shackle implementations), the end of the locking leg is as described above and engages the terminal bolt 150*a*, 150*b* as described above. Removal of the removable shackle 220 from the lock requires two steps. First, one leg of the shackle (e.g., 222*a*) is unlocked from the lock, but not removed from the lock. Then the second leg of the shackle (e.g., 222*b*) is unlocked and the removable shackle 220 is pulled out of the lock. More particularly, the removable shackle 220 is pulled away from the lock when the control knob 40 is rotated to free the end of the first leg (e.g., 222*a*) from the terminal bolt 150*a*, 150*b*. Since the removable shackle 220 is being pulled outward when the control knob 40 is rotated, the locking plate 70 of the unlocked leg is at least pulled into the bore 154 to prevent the unlocked leg from being relocked by the terminal bolt 150*a*, 150*b* when the control knob is released. The shank 68 of the other leg (e.g., 222*b*) is longer and its locking plate 70 engages the wall of the terminal bolt 150*b* adjacent the bore 154 of the bolt thereby securing it in the lock when the other leg 222*a* of the shackle is unlocked and partially pushed out of the lock. The movement of the removable shackle 220 out of the lock is limited by the unlocked leg 222*b* by the engagement of its locking plate 70 with its terminal bolt 150*b* as described above. The spring biased hollow pistons 160 push the against the locking plates 70 of both legs 222*a* and 222*b* and push the shackle legs toward the first end 18 of the lock. The locked leg's locking plate 70 is still engaged with its terminal bolt 150*b* and prevents the removable shackle 220 from being pushed out of the terminal bolts and removed from the lock. To unlock the removable shackle 220 to permit its removal from the lock, the control knob 40 is then rotated in the opposite direction to unlock the leg 222*b* still locked in the lock. The twisting of the control knob 40 frees the locked leg 222*b* and the hollow piston 160 engaging its locking plate 70 forces the locking plate into the bore 154 of the terminal bolt 150*b*. This prevents automatic relocking of the removable shackle 220 in the lock. The removable shackle 220 can then be pulled free of the lock because the locking plates 70 of both legs 222*a* and 222*b* are now unlocked and residing in the bores 154 of their respective terminal bolts 150*a*, 150*b*. Thus, the locking plates 70 are now free to slide through the bore 154 of their respective terminal bolt 150*a*, 150*b* and out of the lock through the shackle orifices 26*a*, 26*b* toward the first end 18 of the lock. If the removable shackle 220 is pushed back inward into the lock, the removable shackle would be locked into the cable lock via a shackle locking mechanism (which in one implementation is the same as the cable locking mechanism described previously). More particularly, the locking plates 70 would slide back through their bores 154 forcing the spring-loaded hollow pistons 160 back and once the locking plates are free of their bores, the terminal bolts 150*a*, 150*b* would slide towards the middle of the lock and the locking plates would engage the terminal bolts as described above, thereby locking the removable shackle 220 into the lock. It is noted that the roles of the removable shackle legs 222*a* and 222*b* as described above can be reversed with the leg 222*b* being freed first followed by the leg 222*a*. In this alternate implementation, the shank 68 of leg 222*a* would be longer than that of leg 222*b*.

In another implementation shown in FIG. 20, the cable lock is configured with a U-shaped rotatable shackle 221 having a cylindrical cross-section, where one leg (e.g., 223*a*) of the shackle remains fixed in the lock, but the other leg (e.g., 223*b*) of the shackle, when the lock is unlocked, is able to be pulled from the shackle orifice (e.g., 26*b*) of the lock and rotate around on the leg retained in the lock. Referring to FIGS. 1, 4, 18 and 20, in the depicted implementation, the end of the lockable/unlockable leg (e.g., 223*b*) is similar to the terminal ends 32*a*, 32*b* described previously (see FIG. 12). The end of lockable/unlockable leg 223*b* has a receiver section 66 which can be received in shackle orifice 26*b*. A shank 68 extends from the end of the receiver section 66 and is terminated by a locking plate 70. The end of the lockable/unlockable leg 223*b* is received in, locked in and unlockable from the shackle orifice 26*b* and the terminal bolt 150*b* via the shackle locking and release mechanisms in the same manner as the previously described terminal end 32*b* of the lockable cable 30 was locked and unlocked using the cable locking and release mechanisms. The permanently attached leg 223*a* has a cylindrical shank 226 ending with a retainer end cap 228, and the orifice 26*a* receiving the permanently attached leg 223*a* has a fixed bolt 232 in the bolt slot 82 (similar to the cable 238 and fixed bolt 232 in FIG. 18). As described above with respect to a lockable cable (238 in FIG. 18) having one end permanently secured to the lock, the cylindrical shank 226 is secured in the groove 234 by retainer 132 and by the retainer end cap 228. The cylindrical shank 226 is long enough to permit the other leg (e.g., 223*b*) of the shackle to be pulled out and removed from the shackle orifice 26*b* when unlocked as described above. This permits the lockable/unlockable leg 223*b* of the rotatable shackle to be rotated around the permanently attached leg 223*a*. When the rotatable shackle 221 is locked in the lock, the cylindrical shank 226 extends into the longitudinal slot 84 (similar to FIG. 18). It is noted that the location of the lockable/unlockable leg and the permanently attached leg can be switched as long as the fixed bolt 232 is installed in the bolt slot 82 corresponding to the side of the lock where the permanently attached arm is installed.

Figure 21:
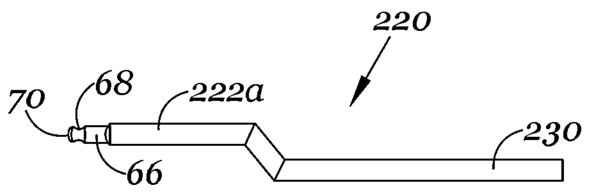
FIG. 21 is a diagram illustrating a plan side view, in simplified form, of an exemplary implementation of the removable shackle of FIG. 19.

Referring to FIG. 21, to minimize interference from the slidable cables 28*a*, 28*b*, in one implementation the removable shackle 220 is bent with the two legs 222*a*, 222*b* of the shackle in the same plane as the slidable cables (the "lock plane" herein) and the clasp section 230 of the shackle in a plane offset from the lock plane. The offset plane can be above or below the lock plane. Similarly, in one implementation the rotatable shackle (221 in FIG. 20) is bent with the two legs of the shackle in the lock plane and the clasp section of the shackle in a plane offset from the lock plane. Here again, the offset plane can be above or below the lock plane.

1.7 Permanent Clasp Implementations

Figure 22:
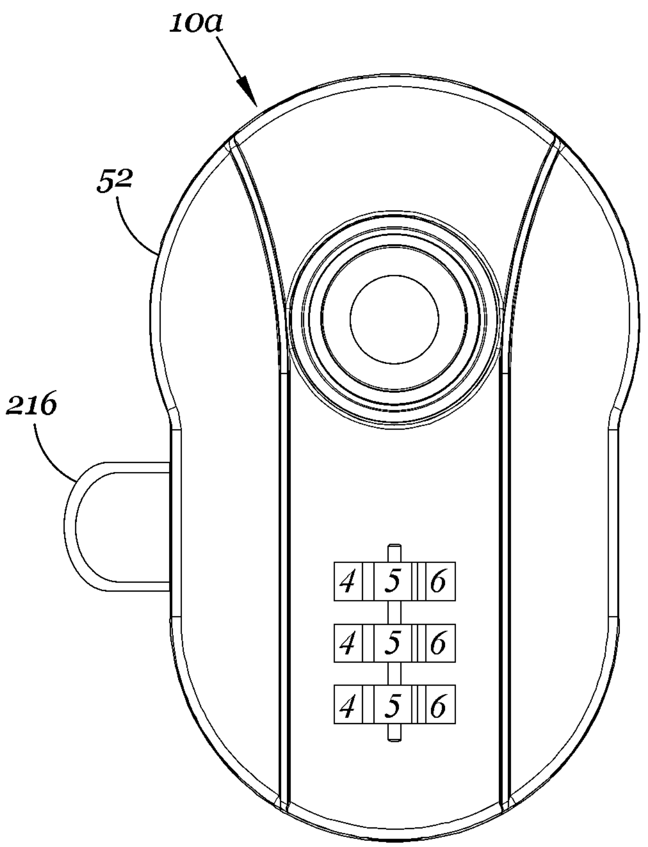
FIG. 22 is a diagram illustrating a plan top view, in simplified form, of an exemplary implementation of the cable lock described herein with a clasp.

Referring to FIG. 22, the cable lock 10A can be fitted with a permanent clasp 216 which is secured to the body via the front or back shell. In the implementation depicted in FIG. 22, the clasp 216 is shown attached to the first side 52, but it can be attached to the second side, the front or the like. The clasp normally would be positioned on the lock so as not to interfere with the slidable cables and/or lockable cables. In addition, while a U-shaped clasp is shown in FIG. 22, other appropriate shapes could also be used, such as a square shape, rectangular shape, triangular shape, ring shape, and so on. The clasp advantageously allows a user to secure the cable lock, and anything attached to the slidable and/or lockable cables using a separate locking device, if desired.

1.8 Reverse Slidable Cable Implementation

In the cable lock implementations described previously, when the cable lock is in the locked state, the slidable cable locking mechanism prevented the movement of each slidable cable into the top-side orifice of a cable channel, through the cable channel and out of the bottom-side orifice but allowed the movement of each slidable cable into the bottom-side orifice of the cable channel, through the cable channel and out of the top-side orifice. However, in some applications it is more convenient if, when the cable lock is in the locked state, the slidable cable locking mechanism allowed the movement of each slidable cable into the top-side orifice of a cable channel, through the cable channel and out of the bottom-side orifice but prevented the movement of each slidable cable into the bottom-side orifice of the cable channel, through the cable channel and out of the top-side orifice.

Figure 23:
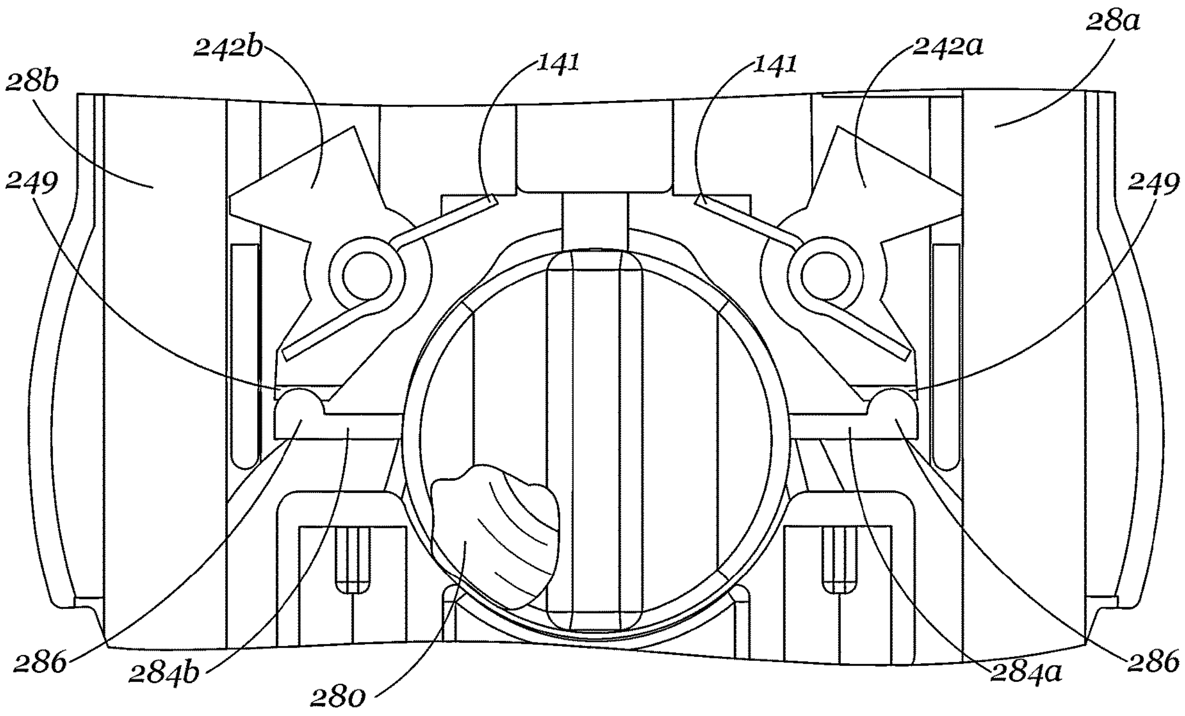
FIG. 23 is a diagram illustrating a plan view, in simplified form, of an exemplary implementation of a portion of the interior of the cable lock described herein as viewed with the back shell of the lock body removed with alternate cable buckles and control ring.
Figure 24A:
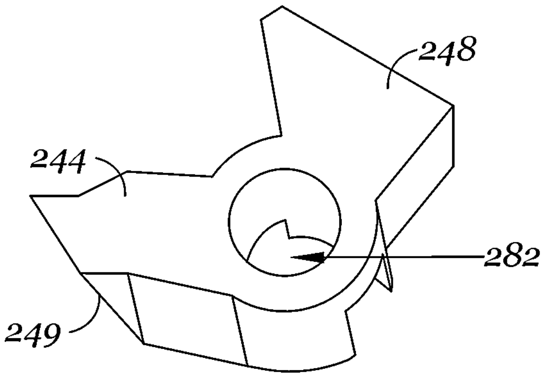
FIGS. 24A-B are diagrams illustrating two perspective views from different angles, in simplified form, of an exemplary implementation of the alternate cable buckle of FIG. 23.
Figure 24B:
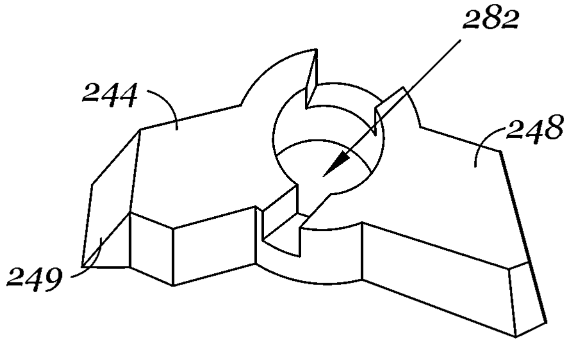
Figure 25:
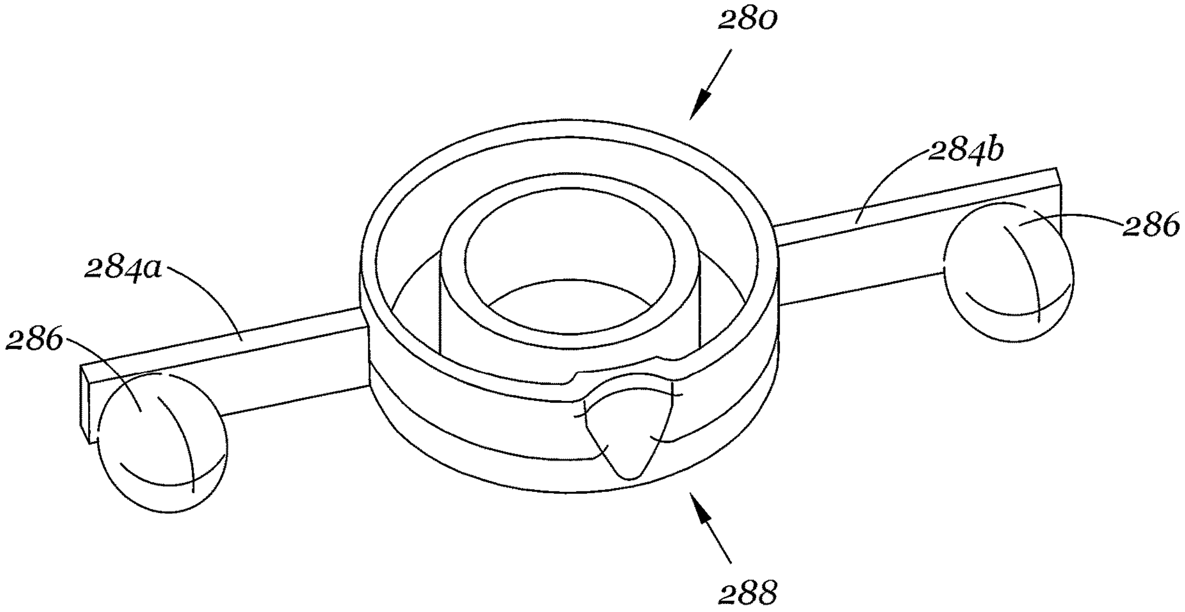
FIG. 25 is a diagram illustrating a perspective view, in simplified form, of an exemplary implementation of a modified control ring of the cable lock implementations described herein for use in the cable lock of FIG. 23.

The foregoing reverse mode of operation can be achieved by replacing the cable buckles 140*a* and 140*b* (as best seen in FIGS. 5 and 9A-C) with modified cable buckles 242*a* and 242*b*, as exemplified in FIGS. 23 and 24A-B. In addition, the control ring 120 (as best seen in FIGS. 4 and 8) is replaced with the modified control ring 280, an implementation of which is shown in FIG. 25. More particularly, referring to FIGS. 23, 24A-B and 25, cable buckles 242*a* and 242*b* are positioned on either side of the control ring 280 and each has a bore 282, which is received on one of the shafts 78 extending out from the internal side of the front shell 14 for pivotal movement (FIG. 6). Each cable buckle 242*a*, 242*b* has a cam arm 244 at one end which engages a finger 284*a* or 284*b* of the control ring 280 and a cable engagement arm 248 at the opposite end of the cable buckle which engages a slidable cable 28*a* or 28*b* as described herein. Cable buckles 242*a* and 242*b* are mirror images of each other and are not interchangeable and each must be positioned in the lock body as shown in FIG. 23. The cable buckles 242*a* and 242*b* are spring loaded by spiral springs 141 and the springs biases the cam arm 244 of each cable buckle against the end nub 286 of a finger 284*a*, 284*b* of the control ring 280. When the lock is locked, the cable engagement arm 248 is pressed against a slidable cable 28*a*, 28*b*, as shown in FIG. 23. The engagement arm 248 prevents the slidable cable 28*a*, 28*b* from being slid through the lock away from the first end 18 of the lock when the lock is locked. However, the slidable cables 28*a*, 28*b* can be slid through the lock toward the first end 18 regardless.

As described above, the control knob 40 cannot be depressed when the lock is locked. When the lock is unlocked and the control knob is depressed, the shelf 50 of the control knob shaft pushes against the bottom side 288 of the control ring 280 and partially pushes the control ring out its receiver 74 in the interior of the front shell 14 towards the back shell 16 (FIG. 6), which in turn forces the end nubs 286 of the fingers 284*a*, 284*b* of the control ring against a beveled surface 249 of each cam arm 244 of both cable buckles 242*a*, 242*b*. The beveled surface 249 of each cam arm 244 slides over a control ring finger 284*a*, 284*b* which pivots the cable engagement arm 248 of each cable buckle 242*a*, 242*b* away from the slidable cables 28*a*, 28*b*. This permits the slidable cables 28*a*, 28*b* to be slid through the lock away from the first end 18 of the lock, that is, it permits the lock to be slid up the cables in the direction of the first end 18 of the lock letting cable enter the first orifices 22*a*, 22*b* and exit the lock out of the second orifices 24*a*, 24*b*. Of course, the control knob 40 can only be depressed into the lock when the lock is unlocked. When the control knob 40 is released, the spring 118 (FIG. 4) pushes the control ring 280 back into its receiver 74, the pressure of the fingers 284*a*, 284*b* against the cam arms 244 is released permitting the cam buckles 242*a*, 242*b* which are spring loaded as described above to rotate so that the cable engagement arms 244 engage the slidable cables 28*a*, 28*b* and prevent the slidable cables from sliding away from the first end 18 of the lock. When the cable engagement arm 244 engages the cable 28*a*, 28*b*, the end of cable engagement arm pushes against the cable and prevents the cable from being slid down in the direction of the second end 20 of the lock.

Figure 26A:
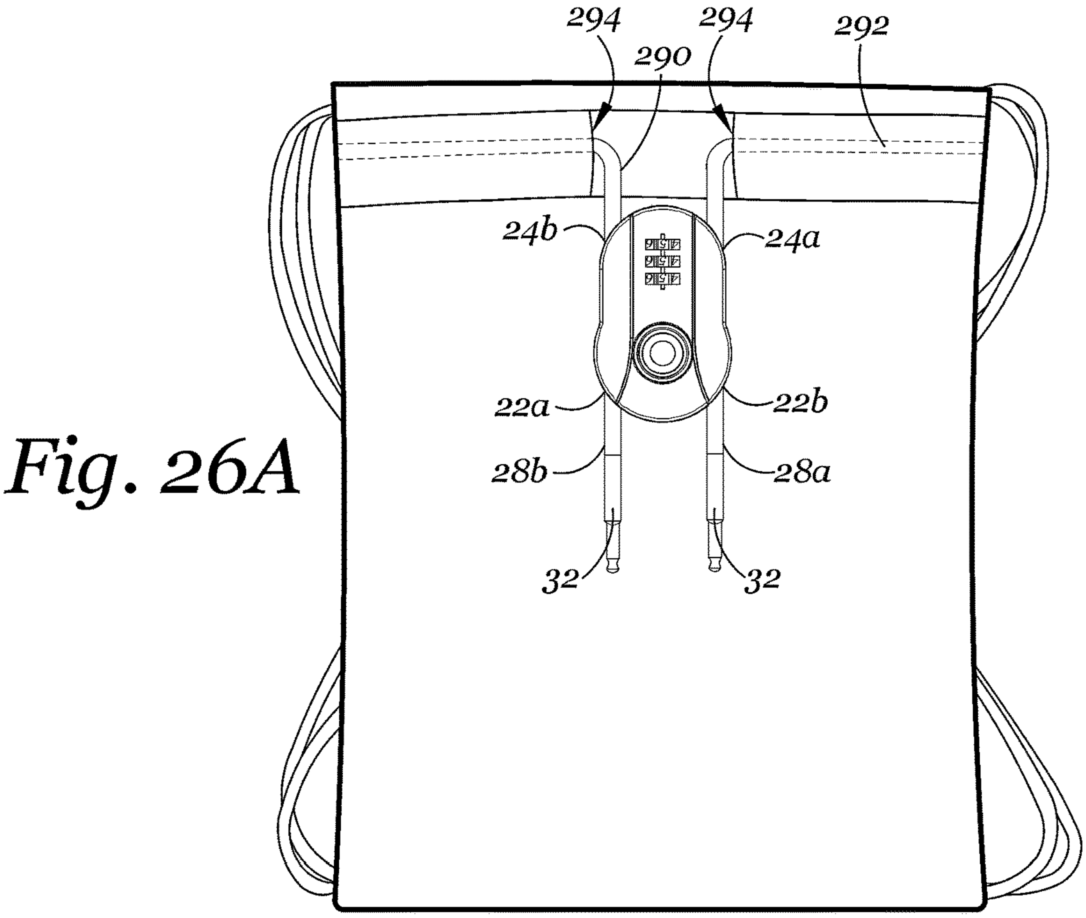
FIGS. 26A-B are plan diagrams illustrating a cable lock application that employs the reverse mode of operation of the cable lock of FIG. 23 to secure a draw string storage bag using slidable cables.
Figure 26B:
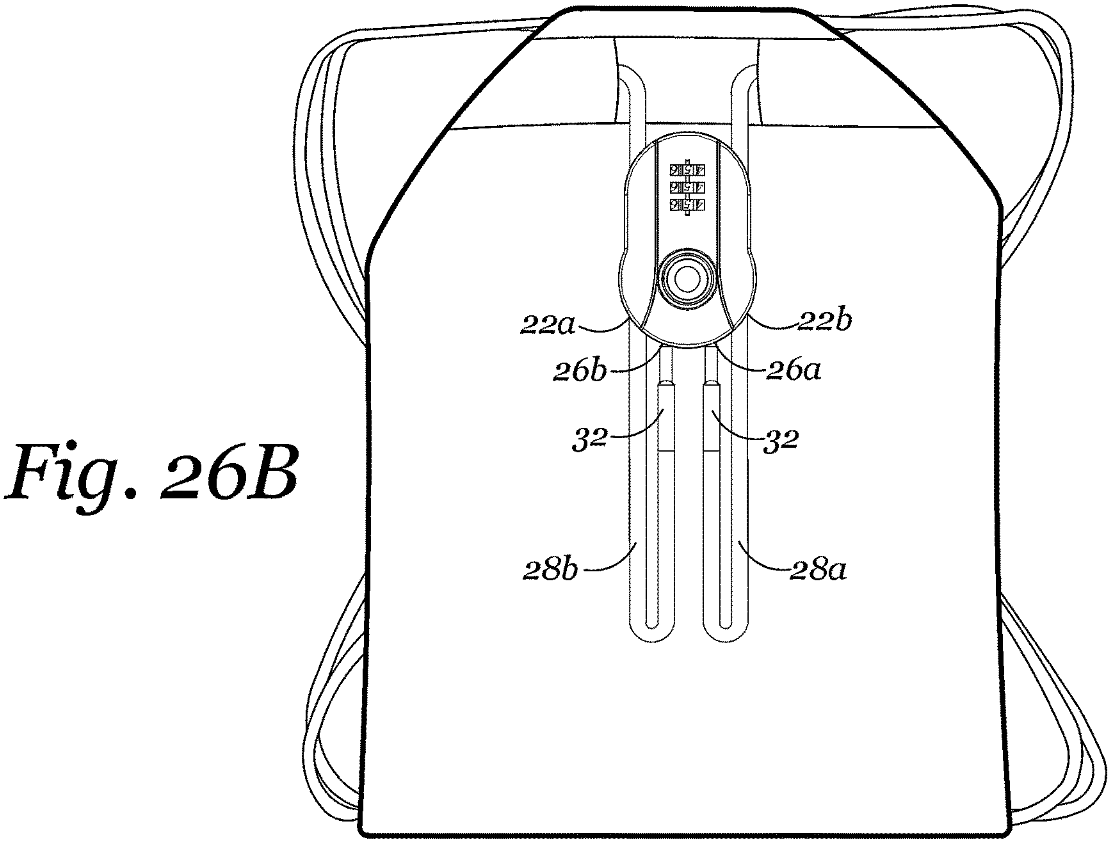

One application that advantageously employs the reverse mode of operation involves using the slidable cables to secure the cable lock, and anything attached to the slidable cables (such as the previously described draw string storage bag), to a nearby fixed structure. More particularly, referring to FIG. 26A, the slidable cables 28*a*, 28*b* take the form of the two end sections of a single lock cable 290 whose middle section resides an existing or added separate channel 292 at the opening of the draw string bag 296, when it is in the open position as shown in FIG. 26A. In addition, although not shown in FIG. 26A, the single lock cable could share the same channel with the draw string cable(s) of the bag. The channel 292 has adjacent openings 294 where the end sections of the lock cable extend from and into the slidable cable orifices 24*a*, 24*b* of the cable lock. As the draw string bag 296 is cinched shut, a portion of the middle section of the lock cable 290 on both sides is forced out of the channel openings 294, and the cable lock is slid up the two sides of the lock cable to the now closed bag opening, as shown in FIG. 26B. Since the cable lock cannot slide in the direction away from the closed bag opening, it acts to secure the bag opening in its closed position. Terminal ends 32 (FIG. 12) are attached to each end section of the lock cable. Once the cable lock is slid up against the closed bag opening, the two sides of the lock cable 290 extending out of the slidable cable orifices 22*a*, 22*b* of the cable lock are wrapped around, or otherwise secured to, a nearby fixed structure. Then, one of the terminal ends 32 is inserted and locked into the lockable cable orifice 26*a* of the cable lock, and the other terminal end 32 is inserted and locked into the lockable cable orifice 26*b*. This secures the cable lock and the bag 296 to the fixed structure. In this implementation, the previously described lockable cable is not employed. However, in an alternate version, the lockable cable is employed as described previously, and the ends of the lock cable 290 (with or without terminal ends 32 installed) simple hang free.

1.9 Keyed Lock Implementations

Figure 27:
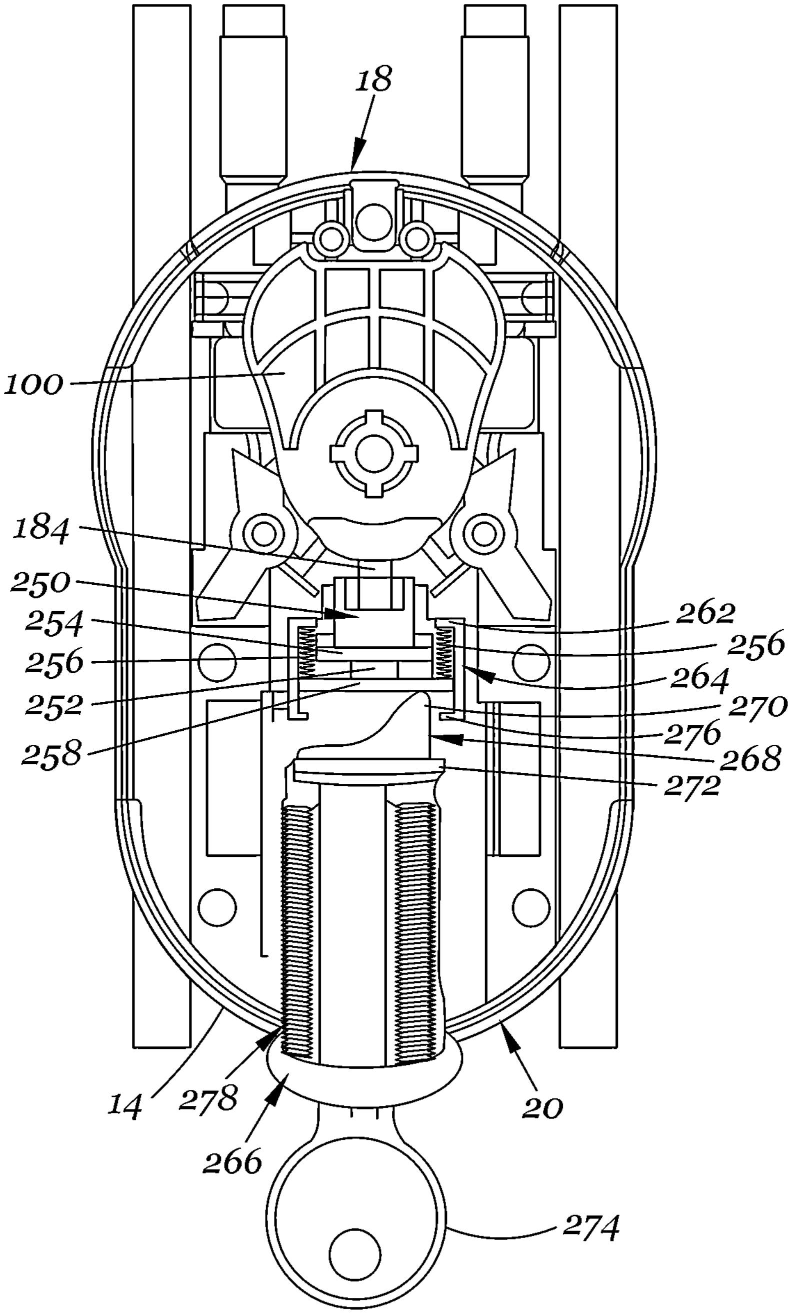
FIG. 27 is a diagram illustrating a plan view, in simplified form, of an exemplary implementation of the interior of the cable lock described herein as viewed with the back shell of the lock body removed and with a keyed lock mechanism in lieu of a combination lock mechanism.
Figure 28:
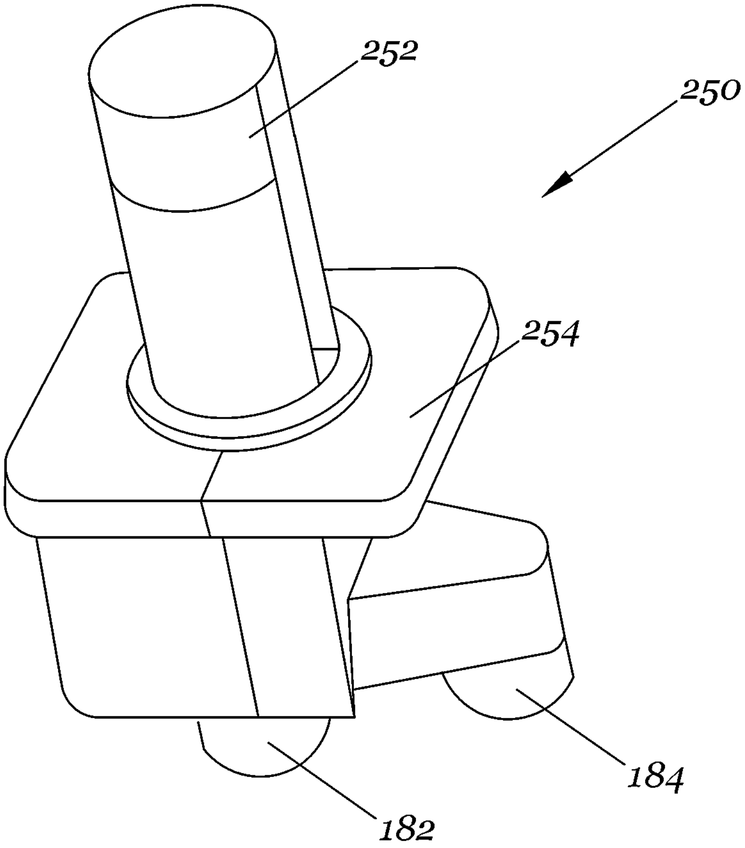
FIG. 28 is a diagram illustrating a perspective view, in simplified form, of an exemplary implementation of a modified lock core of the cable lock implementations described herein for use in the keyed lock mechanism of FIG. 27.

In one implementation of the cable lock, the combination lock features described previously are eliminated in lieu of a keyed lock mechanism. For example, one keyed lock mechanism version of the cable lock eliminates the support sleeves (186 in FIG. 4) and combination wheels (38 in FIG. 4), the reset cap (198 in FIG. 4), the spring (200 in FIG. 4) and the plate (210 in FIG. 4). The slots (e.g., 36 in FIGS. 1 and 4) on the front and back shells 14, 16 of the cable lock are also eliminated. In addition, the lock core (e.g., 168 in FIGS. 4, 5 and 13) is modified as shown in FIGS. 27 and 28. The modified lock core 250 is similar to the previous lock core except that the shaft portion has been replaced with a shorter stub 252. In addition, the back plate 254 of the lock core is not as wide in the modified version so as to allow room for a pair of coil springs 256 to reside on either side of the lock core's back plate.

Figure 29:
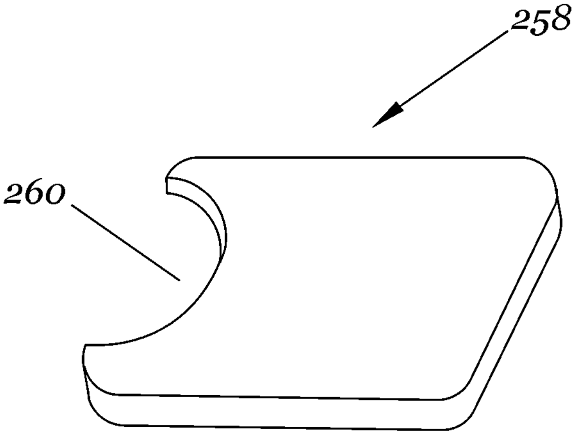
FIG. 29 is a diagram illustrating a perspective view, in simplified form, of an exemplary implementation of a modified spring plate of the cable lock implementations described herein for use in the keyed lock mechanism of FIG. 27.

The spring plate (e.g., 202 in FIGS. 4 and 5) is also modified in the keyed lock mechanism implementations as shown in FIGS. 27 and 29. The modified spring plate 258 is attached to the distal end of the lock core stub 252 and has an arched-shaped cutout 260 on one of its edges.

The aforementioned pair of coil springs 256 are installed on either side of the lock core 250 and extend between the spring plate 258 and shoulders 262 formed by the lock core retaining structure 264 formed on the interior side of the front shell 14 and the back shell (not shown). The size of the springs 256 is chosen so as to fit in the above-described locations and to exert a force capable of pushing the spring plate 258 (and the attached lock core 250) toward the bottom 20 of the cable lock, which as will be described shortly places the cable lock in its unlocked condition.

A keyed lock unit is also employed. In one implementation depicted in FIG. 27, the keyed lock unit 266 takes the form of a conventional cylindrical-shaped lock with internal components that only allow the rotation of an end plate when the proper key is inserted into the lock and rotated. In such a conventional cylindrical keyed lock unit, a post typically extends from the end plate in a direction parallel to the central axis of the unit. However, in the keyed lock unit 266 employed herein, the post has been replaced with a cam shaped projection 268 as shown in FIG. 27. The cam shaped projection 268 has an extended portion 270 disposed near the periphery of the end plate 272 that projects away from the plate in a direction that is parallel to the central axis of the keyed lock unit 266. The cam shaped projection 268 interfaces with the spring plate 258 in the following manner. When the key 274 (which is matched to the lock) is inserted into the keyed lock unit 266 and rotated (or kept) into an unlocked position, the extended portion 270 of the cam shaped projection projects into the arched-shaped cutout 260 of the spring plate 258. In this position, the cam shaped projection 268 does not exert pressure on the spring plate 258. Accordingly, the coil springs 256 are free to push the spring plate 258 (and the attached lock core 250) toward the bottom 20 of the cable lock. It is noted that in one version, the length of the lock core stub 252 is chosen so that when the attached spring plate 258 is pushed toward the bottom 20 of the cable lock, it bottoms out on a small shoulder 276 at the bottom end of the lock core retaining structure 264 after having moved just enough for the cam finger 184 to clear the slot in the back side of the control plate 100 and the locking finger 182 to clear the locking groove in the control ring (thus putting the cable lock into the unlocked condition as described previously). When the key 274 is rotated into a locked position, the edge of the cam shaped projection 268 slides along the edge of the arch shaped cutout 260 (which in one version is beveled to facilitate the sliding motion) and pushes the spring plate 258 upward toward the top 18 of the cable lock and compresses the coil springs 256. When the extended portion 270 of the cam shaped projection 268 clears the arch shaped cutout 260 of the spring plate, the lock core 250 is fully engaged. More particularly, the cam finger 184 is disposed in the slot in the back side of the control plate 100 and the locking finger 182 is disposed in the locking groove in the control ring (thus putting the cable lock into the locked condition as described previously). It is noted that the extended portion 270 of the cam shaped projection 268 clears the arch shaped cutout 260 of the spring plate when the key 274 has been rotated (either clockwise or counterclockwise depending on the keyed lock unit employed) about 90 degrees (although the lock core remains fully engaged even if the key is rotated 180 degrees or more). The 90-degree position is shown in FIG. 27. However, most keyed lock units are designed to rotate about 180 degrees to go from a locked to unlocked condition (and vice versa). Thus, in operation, the key would be rotated (either clockwise or counterclockwise depending on the keyed lock unit employed) about 180 degrees to place the cable lock in its locked position. It is also noted that in the version depicted in FIG. 27, the arched cutout 260 in the spring plate 258 is oriented toward the front of the cable lock (and so cannot be seen), however, it could be pointed toward the back of the cable lock as long as the keyed lock unit 266 is rotated to match (but not to the sides because of the coil springs 256 pushing on the plate).

It is further noted that the reset hole 34 (e.g., as shown in FIG. 1) is replace in the keyed lock mechanism implementations with a larger hole 278 capable of accommodating the keyed lock unit 266. In addition, the length of the keyed lock unit 266 is chosen so that it does not exceed the free space between the bottom end of the cable lock 20 and the bottom of the lock core retaining structure 264.

2.0 Additional Implementations

While the cable lock has been described by specific reference to implementations thereof, it is understood that variations and modifications thereof can be made without departing from the true spirit and scope of the apparatus. For example, while the actuator of the slidable cable release mechanism and lockable cable release mechanism was described as the control knob (e.g., 40 in FIG. 1), other actuator configurations are possible (e.g., slides, pull tabs, and so on), which employ a single actuator for both release mechanisms or separate actuators of each release mechanism.

It is also noted that any or all of the aforementioned implementations throughout the description may be used in any combination desired to form additional hybrid implementations. In addition, although the cable lock implementations have been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of the appended claims. In regard to the various functions performed by the above described components and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter.

Wherefore, what is claimed is:

1. A cable lock, comprising:

at least one cable channel, each cable channel comprising, a top-side cable orifice disposed on a top side of the cable lock, a bottom-side cable orifice disposed on a bottom side of the cable lock, said top-side cable orifice having internal communication through a body of the cable lock with the bottom-side cable orifice, and wherein the at least one cable channel is adapted to receive a slidable cable which passes through the at least one cable channel and out of the top-side and bottom-side cable orifices;

a slidable cable locking mechanism that whenever in a locked state prevents movement of the slidable cable into the top-side cable orifice of the cable channel, through the at least one cable channel and out of the bottom-side cable orifice, but allows the movement of the slidable cable into the bottom-side cable orifice of the at least one cable channel, through the at least one cable channel and out of the top-side cable orifice, and that whenever the slidable cable locking mechanism is in an unlocked state, the slidable cable locking mechanism allows movement of the slidable cable into the top-side cable orifice of the at least one cable channel, through the at least one cable channel, and out of the bottom-side cable orifice when a slidable cable release mechanism is activated, and allows the movement of the slidable cable into the bottom-side cable orifice of the at least one cable channel, through the at least one cable channel and out of the top-side cable orifice regardless of whether the slidable cable release mechanism is activated or not.

2. The cable lock of claim 1, further comprising a cable lock locking mechanism which when locked, places the slidable cable locking mechanism into said locked state, and whenever unlocked, places the slidable cable locking mechanism into said unlocked state.

3. The cable lock of claim 2, wherein the cable lock locking mechanism comprises; a combination lock mechanism: comprising a plurality of rotatable wheels which are partially accessible for rotation from at least a front side of the cable lock, each of said plurality of rotatable wheels having a series of alphanumeric symbols disposed around the periphery of the wheel, and wherein whenever a preset unlock sequence made up of an alphanumeric symbol from each of the plurality of rotatable wheels is aligned in a row and visible in a prescribed location on the front side of the cable lock, the cable lock locking mechanism is unlocked, and wherein whenever the preset unlock sequence is not aligned in a row and visible in a prescribed location on the front side of the cable lock, the cable lock locking mechanism is locked.

4. The cable lock of claim 1, wherein the slidable cable release mechanism comprises an actuator accessible from a front surface of the cable lock, which when depressed when the slidable cable locking mechanism is in the unlocked state allows movement of the slidable cable into the top-side cable orifice of the at least one cable channel, through the at least one cable channel and out of the bottom-side cable orifice of the at least one cable channel.

5. The cable lock of claim 1, further comprising a lockable cable comprising, a fixed end that is permanently attached to the cable lock, and a terminal end that is insertable into the cable lock via a lockable cable orifice disposed on the top side of the cable lock and into a lockable cable locking mechanism disposed within the body of the cable lock, wherein the lockable cable locking mechanism whenever in a locked state is adapted to receive the terminal end of the lockable cable and to prevent the withdrawal of the terminal end from the lockable cable orifice, and whenever in an unlocked state allows the terminal end of the lockable cable which is locked into the lockable cable locking mechanism to be withdrawn from the lockable cable orifice when a lockable cable release mechanism is activated.

6. The cable lock of claim 5, wherein the lockable cable release mechanism comprises an actuator accessible from a front surface of the cable lock, which when rotated in a first direction when the lockable cable locking mechanism is in the unlocked state allows the terminal end of the lockable cable which is locked into the lockable cable locking mechanism to be withdrawn from the lockable cable orifice.

7. The cable lock of claim 5, further comprising a cable lock locking mechanism which when locked places the lockable cable locking mechanism into said locked state, and whenever unlocked places the lockable cable locking mechanism into said unlocked state.

8. The cable lock of claim 5, wherein the fixed end of the lockable cable and the terminal end of the lockable cable are two opposite ends of a single cable which is used to secure the cable lock and any other item secured to the cable lock to an object by looping the lockable cable around or through the object.

9. The cable lock of claim 1, further comprising:

a lockable cable comprising two terminal ends each of which is insertable into the cable lock via a different one of a pair of lockable cable orifices disposed on the top side of the cable lock and into a lockable cable locking mechanism disposed within the body of the cable lock, wherein the lockable cable locking mechanism whenever in a locked state is adapted to receive the terminal ends of the lockable cable and to prevent the withdrawal of the terminal ends from the pair of lockable cable orifices, and whenever in an unlocked state allows each terminal end of the lockable cable which is locked into the lockable cable locking mechanism to be withdrawn from the lockable cable orifice the terminal end of the lockable cable is inserted into when a lockable cable release mechanism is activated; and wherein, the lockable cable release mechanism comprises an actuator accessible from a front surface of the cable lock, which when rotated in a first direction when the lockable cable locking mechanism is in the unlocked state allows a first one of the terminal ends of the lockable cable which is locked into the lockable cable locking mechanism to be withdrawn from a first one of the pair of lockable cable orifices, and when rotated in a second direction when the lockable cable locking mechanism is in the unlocked state allows a second one of the terminal ends of the lockable cable which is locked into the lockable cable locking mechanism to be withdrawn from a second one of the pair of lockable cable orifices.

10. The cable lock of claim 9, further comprising a cable lock locking mechanism, which when locked, places the lockable cable locking mechanism into said locked state, and whenever unlocked, places the lockable cable locking mechanism into said unlocked state.

11. The cable lock of claim 9, wherein the ends of the lockable cable are two opposite ends of a single cable which is used to secure the cable lock and any other item secured to the cable lock to an object by looping the cable around or through the object.

12. The cable lock of claim 1, further comprising a rotatable shackle comprising:

a cylindrical rod with two ends that is bent so that the two ends of the cylindrical rod are parallel;

a terminal end that is insertable into the cable lock via a shackle orifice disposed on the top side of the cable lock and into a shackle locking mechanism disposed within the body of the cable lock, wherein the shackle locking mechanism whenever in a locked state is adapted to receive the terminal end of the rotatable shackle and to prevent the withdrawal of the terminal end of the rotatable shackle from the shackle orifice, and whenever in the unlocked state allows the terminal end of the rotatable shackle which is locked into the shackle locking mechanism to be withdrawn from the shackle orifice when a shackle release mechanism is activated; and a fixed rotatable end that is permanently attached to the top side of the cable lock, but which whenever the shackle locking mechanism is in an unlocked state and the shackle release mechanism is activated, is able to be pulled outward from the cable lock to a degree that the terminal end of the rotatable shackle is withdrawn from the shackle orifice and able to be rotated about the fixed rotatable end.

13. The cable lock of claim 12, wherein the shackle release mechanism comprises an actuator accessible from a front surface of the cable lock, which when rotated in a first direction when the shackle locking mechanism is in the unlocked state allows the terminal end of the rotatable shackle which is locked into the shackle locking mechanism to be withdrawn from the shackle orifice.

14. The cable lock of claim 12, further comprising a cable lock locking mechanism which when locked places the shackle locking mechanism into said locked state, and whenever unlocked places the shackle locking mechanism into said unlocked state.

15. The cable lock of claim 12, wherein the rotatable shackle is used to secure the cable lock and any other item secured to the cable lock to an object by attaching the rotatable shackle to the object.

16. The cable lock of claim 1, further comprising a removable shackle comprising, a rod with two terminal ends that is bent so that the terminal ends of the rod are parallel; and each of the two terminal ends of the rod are insertable into the cable lock via a different one of a pair of shackle orifices disposed on the top side of the cable lock and into a shackle locking mechanism disposed within the body of the cable lock, wherein the shackle locking mechanism whenever in a locked state is adapted to receive the terminal ends of the rod and to prevent the withdrawal of the terminal ends of the rod from the shackle orifices, and whenever in an unlocked state allows each terminal end of the rod which is locked into the shackle locking mechanism to be withdrawn from the shackle orifices when a shackle release mechanism is activated.

17. The cable lock of claim 16, wherein the shackle release mechanism comprises an actuator accessible from a front surface of the cable lock, which when rotated in a first direction when the shackle locking mechanism is in the unlocked state allows a first one of the terminal ends of the rod which is locked into the shackle locking mechanism to be withdrawn from a first one of the pair of shackle orifices while a second one of the terminal ends which is longer than the first one of the terminal ends is pulled outward from the cable lock to a degree that the first one of the terminal ends of the rod is withdrawn from the first shackle orifice and the second one of the terminal ends remains locked into the shackle locking mechanism, and when rotated in a second direction when the shackle locking mechanism is in the unlocked state allows the second one of the terminal ends of the rod to be withdrawn from the second shackle orifice.

18. The cable lock of claim 16, further comprising a cable lock locking mechanism which when locked places the shackle locking mechanism into said locked state, and whenever unlocked places the shackle locking mechanism into said unlocked state.

19. The cable lock of claim 16, wherein the removable shackle is used to secure the cable lock and any other item secured to the cable lock to an object by attaching the removable shackle to the object.

* * * * *